United States Patent [19]

Terada

[11] Patent Number: 5,719,689
[45] Date of Patent: Feb. 17, 1998

[54] IMAGE PROCESSING APPARATUS

[75] Inventor: Yoshihiro Terada, Ebina, Japan

[73] Assignee: Fuji Xerox Co., Ltd., Tokyo, Japan

[21] Appl. No.: 544,103

[22] Filed: Oct. 17, 1995

[30] Foreign Application Priority Data

Oct. 28, 1994 [JP] Japan .................. 6-288830
Sep. 18, 1995 [JP] Japan .................. 7-263560

[51] Int. Cl.$^6$ .................. G03F 3/08; H04N 1/46
[52] U.S. Cl. .................. 358/529; 358/515; 358/518; 358/455; 358/534
[58] Field of Search .................. 358/455, 465, 358/518, 529, 515, 461, 534, 503

[56] References Cited

U.S. PATENT DOCUMENTS

| | | | |
|---|---|---|---|
| 4,614,967 | 9/1986 | Sayanagi | 358/526 |
| 5,008,742 | 4/1991 | Shigaki et al. | 358/529 |
| 5,161,010 | 11/1992 | Birnbaum | 358/526 |
| 5,257,116 | 10/1993 | Suzuki | 358/465 |
| 5,315,382 | 5/1994 | Tanioka | 358/523 |
| 5,392,139 | 2/1995 | Murata | 358/529 |
| 5,428,377 | 6/1995 | Stoffel et al. | 358/529 |
| 5,493,323 | 2/1996 | Harrington | 347/251 |

FOREIGN PATENT DOCUMENTS

A-12-281877 11/1990 Japan.

*Primary Examiner*—Edward L. Coles, Sr.
*Assistant Examiner*—Mark Wallerson
*Attorney, Agent, or Firm*—Oliff & Berridge, P.L.C.

[57] ABSTRACT

An image processing apparatus for converting a color image into an image of an N (N=2, 3, . . . ) number of colors, i.e., black and other colors, is disclosed. In the image processing apparatus, a gray-component extracting unit extracts a gray component signal from input color image signals, and produces remaining-color-component signals. A black signal generating unit generates a black signal by using the gray component signal and the remaining-color-component signals. A color signal generating unit generates a color signal by using the remaining-color-component signals. The image processing apparatus may further include first print signal generating means for developing a black signal outputted from the black signal generating means into a black dot pattern, second print signal generating means for developing a color signal outputted from the color signal generating means into a color dot pattern, and adjust means for adjusting the print signals outputted from the first and the second print signal generating means so that when a black dot of the black dot pattern and a color dot of the color dot pattern occupy the same dot position, one of the black and the color dots is preferentially used for print.

8 Claims, 29 Drawing Sheets

FIG.10A
| 16 | 5 | 9 | 13 |
|----|---|---|----|
| 12 | 1 | 2 | 6 |
| 8 | 4 | 3 | 10 |
| 15 | 11 | 7 | 14 |
FIG.10B
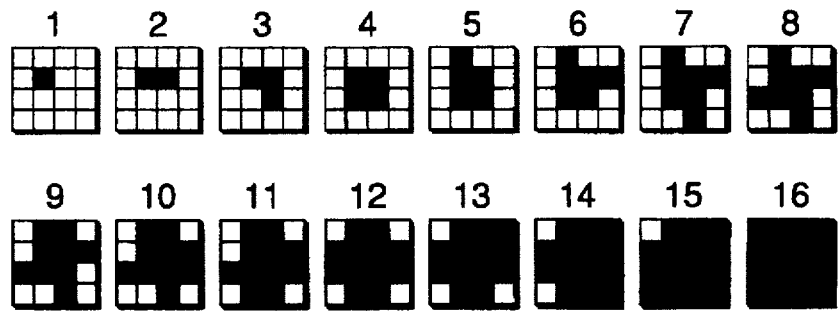
FIG.11A
| 1 | 12 | 8 | 4 |
|---|----|---|---|
| 5 | 16 | 15 | 11 |
| 9 | 13 | 14 | 7 |
| 2 | 6 | 10 | 3 |
FIG.11B
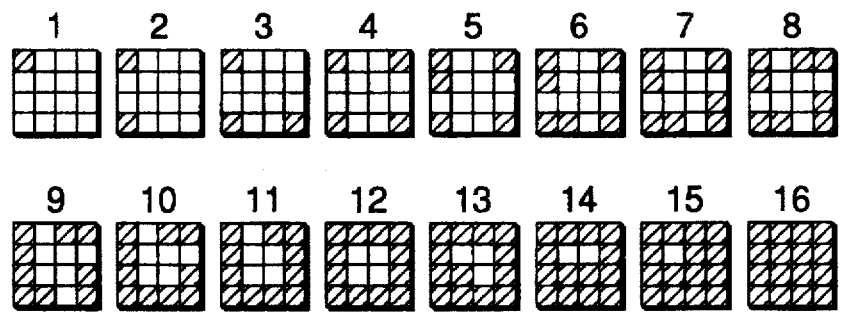

FIG.12

| BINARY BLACK SIGNAL Ka | BINARY COLOR SIGNAL P1a | COMPARISON RESULT SIGNAL Comp | OUTPUT SIGNAL A |
|---|---|---|---|
| OFF | OFF | DON'T CARE | DOT OFF |
| OFF | ON | DON'T CARE | COLOR DOT OFF |
| ON | OFF | DON'T CARE | BLACK DOT ON |
| ON | ON | K≧P1 | BLACK DOT ON |
| ON | ON | K<P1 | COLOR DOT ON |

FIG.13

| BINARY BLACK SIGNAL Ka | BINARY COLOR SIGNAL P1a | OUTPUT SIGNAL A |
|---|---|---|
| OFF | OFF | DOT OFF |
| OFF | ON | COLOR DOT ON |
| ON | OFF | BLACK DOT ON |
| ON | ON | BLACK DOT ON |

AREA 1a

AREA 1d

FIG.25

| EDGE DETECTION SIGNAL KE, P1E | OUTPUT KQ, P1Q OF HALF TONE GENERATOR 311, 312 | OUTPUT KR, P1R OF HALF TONE GENERATOR 316, 317 | OUTPUT SIGNAL Ka, P1a |
|---|---|---|---|
| NOT EDGE | OFF | OFF | OFF |
| NOT EDGE | OFF | ON | OFF |
| NOT EDGE | ON | OFF | ON |
| NOT EDGE | ON | ON | ON |
| EDGE | OFF | OFF | OFF |
| EDGE | OFF | ON | ON |
| EDGE | ON | OFF | ON |
| EDGE | ON | ON | ON |

IMAGE PROCESSING APPARATUS

BACKGROUND OF THE INVENTION

1. Field of the Invention

The present invention relates to an image processing system for converting a color image into an image of an N number of colors that include a black, i.e., black and other colors, for example, black and red, or black, red and blue.

2. Discussion of the Prior Art

The digital image input/output device, such as digital copying machines, digital printers, image scanners, or facsimile devices, increases its variation and the number of its functions. In this circumstances, it is frequently required to convert a digital image of a given format into which the attributes, e.g., resolution, color space, and the number of gray levels, are packed, into a digital image of another format. A specific example of the digital image conversion is to convert a full color image, for example, into an image of two colors, for example, black and red.

It is ideal that a full color image is outputted as it is, viz., in the form of a full color image. In actual use of the image input/output device, some restrictions inevitably exist, however. Restrictions by cost and operation speed, for example, frequently cause the image input/output device to output an input image in the form of an image of two colors, for example, black and red. Sometimes, the restrictions cause a full-color printer to operate in a two color mode. In specific environments of device use, a full color image, gained through a network communication, must be printed out as an image of two colors, e.g., black and red.

An image processing system for converting an input color image into a color image of an N number of colors, i.e., black and other colors, for example, two colors of black and red, is disclosed in Published Unexamined Japanese Patent Application No. Hei. 2-281877. In the publication, the color of an original color image is decomposed, for each pixel, into color components, for example, red, green, blue, yellow, magenta, cyan, and achromatic color, and determines the color on the basis of the decomposed colors. The color of the pixel area on an original color image is determined on the basis of those decomposed colors. If a pixel area is a red area, the image of the pixel area is colored by red in an output image. If a pixel area is not a red area, it is colored by black in the output image.

In the conventional image processing system just mentioned, when a color image is converted into an image of two colors, black and red, red is assigned to a pixel area on an original image that is decided to be a red area, in the output image, and black is assigned to a pixel area decided to be not a red area. Thus, the colors on the output image are distinctly separated. A quality of the reproduction of an original color image depends largely on the contents and the nature of the original color image.

The conventional image processing system is well operable for an original color image, for example, an image on an original document which contains description of black characters and red characters for correction, or an image on an original document which contains black characters and a bar graph simply colored. The resultant output image is satisfactory in quality. When an original color image is a pictorial image, for example, photograph and a natural image, an image containing a graph colored and shaded for 3-dimensional expression, or an image containing an image area of half tone or where color is continuously varied, an output image as the reproduction of such an original color image that is carried out by the conventional image processing system is unsatisfactory in quality.

The conventional image processing system judges the colors on an original color image and those on the image area of half tone or where color is continuously varied. Therefore, the construction for judging the colors is complicated, and the judging operation by the system frequently suffers from errors or inexactness. In a case where an original color image is read by an image scanner as in a color copying machine as a variation of the image input/output device, out-of-registration of colors and blur of color inevitably take place in the stage of the image scanner. To remove the adverse affects by those from the image data gathered, some correction measures are taken. Examples of them are a process of absorbing the characteristics of the image scanner, and a process of removing ghost by a pattern matching method, carried out after the color judgment. The correction measures additionally contribute to complexity of the image input/output device.

SUMMARY OF THE INVENTION

The present invention has been made in view of the above circumstances and has an object to provide an image processing system for converting a color image into an image of an N number of colors, i.e., black and other colors, which is capable of continuously varying a color between the adjacent colors in an output image depicted in the N number of colors, without any process of judging the colors on an original color image.

To achieve the above object, according to first aspect of the invention, there is provided a image processing system for converting a color image into an image of an N (N=2, 3, ... ) number of colors, i.e., black and other colors, comprising: gray-component extracting means (220) for extracting a gray component signal (Gr) from input color image signals (Bi, Gi and Ri) and producing remaining-color-component signals (Bo, Go and Ro); black signal generating means (230) for generating a black signal (K) by using the gray component signal (Gr) and the remaining-color-component signals (Bo, Go and Ro); and color signal generating means (240) for generating a color signal (P1 or P1 and P2) by using the remaining-color-component signals (Bo, Go and Ro).

With such an arrangement, a black signal K and an (N-1) number of color signals (P1, P2, ... ) are produced every pixel of an original color image. Each pixel of an output image is depicted using both the black signal (K) and the color signals (P1, P2, ... ). Therefore, a color between the adjacent colors of the N number of colors in the output image can continuously be varied. In other words, those colors in the output image are not demarcated.

Accordingly, the image processing system thus arranged can provide a good reproduction of the pictorial image, the image containing a graph colored and shaded for 3-dimensional expression, and the image containing an image area of half tone or where color is continuously varied. Additionally, the construction of the image processing system is simple since there is no need of a process for judging the colors of the original color image.

According to another aspect of the present invention, there is provided a image processing system for converting a color image into an image of an N (N=2, 3, ... ) number of colors, i.e., black and other colors, comprising: gray-component extracting means (220) for extracting a gray component signal (Gr) from input color image signals (Bi, Gi and Ri) and producing remaining-color-component signals (Bo, Go and Ro); black signal generating means (230) for generating a black signal (K) by using the gray component signal (Gr) and the remaining-color-component signals (Bo, Go and Ro); color signal generating means (240) for generating a color signal (P1 or P1 and P2) by using the remaining-color-component signals (Bo, Go and Ro); first print signal generating means (311) for developing a black signal (K) outputted from the black signal generating means (230) into a black dot pattern; second print signal generating means (312) for developing a color signal (P1) outputted from the color signal generating means (240) into a color dot pattern; and adjust means (314 or 315) for adjusting the print signals (Ka and P1a) outputted from the first and the second print signal generating means (311 and 312) so that when a black dot of the black dot pattern and a color dot of the color dot pattern occupy the same dot position, one of the black and the color dots is preferentially used for print.

In the second image processing system, the black signal K and the color signal P1 are converted into a print signal Ka for developing a black dot pattern and a print signal P1a for developing a color dot pattern, respectively. Control is carried out such that a black dot of the black dot pattern and a color dot of the color dot pattern do not occupy the same dot position. Even the image output unit 400, which is of such a type that it can print black and color dots to form an output image but cannot print the black and the color dots at the same dot position in superposed fashion, can reproduce an original image of high quality in a less number of colors in which the color between the two colors is continuously varied.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 10A is a diagram showing a dither matrix for the black signal used in the FIGS. 8 and 9 systems;

FIG. 10B is a diagram showing examples of black dot patterns by a binary black signal;

FIG. 11A is a diagram showing a dither matrix for the color signal used in the FIGS. 8 and 9 systems;

FIG. 11B is a diagram showing examples of color dot patterns by a binary black signal;

FIG. 12 is a table showing the logic in a logical operation unit in the image processing system of FIG. 8;

FIG. 13 is a table showing the logic in a logical operation unit in the image processing system of FIG. 9;

FIG. 25 is a table showing the logic in a logical operation unit in the image processing system of FIG. 24;

DETAILED DESCRIPTION OF THE PREFERRED EMBODIMENTS

Figure 1:
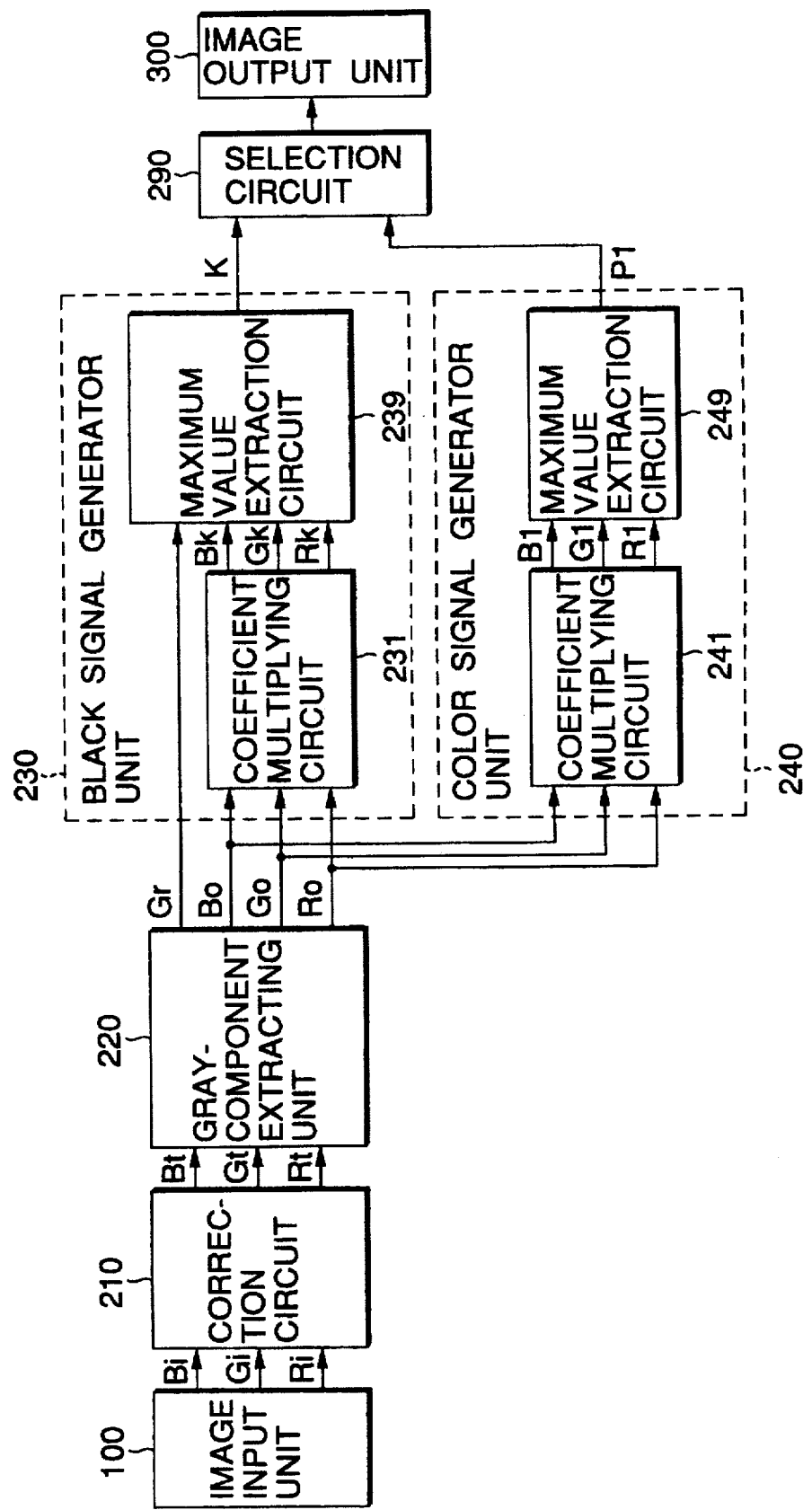
FIG. 1 is a block diagram showing a first embodiment of an image processing system according to the present invention, which is incorporated into a digital copying machine of the two-color print type.

FIG. 1 is a block diagram showing a first embodiment of an image processing system according to the present invention. The image processing system shown is incorporated into a digital copying machine of the two-color print type. The digital copying machine reads a color image (referred to frequently as an original color image) from an original document and reproduces an image of two colors, or black and another color, for example, black and red.

In an image input unit 100, an image sensor, formed of a CCD, for example, reads a color image from an original document, and produces analog color image signals of blue, green and red. The analog color image signals are converted into digital color image signals Bi, Gi and Ri of blue, green and red. Each of the color image signals consists of 8 bits. In the example under discussion and examples to be given later, the input color image signals Bi, Gi and Ri are of the negative. In the image input unit 100, an original document is scanned two times. Accordingly, the input color image signals Bi, Gi and Ri of two frames are repeatedly produced.

The input color image signals Bi, Gi and Ri are supplied to a correction circuit 210. In the correction circuit 210, a tone correction process is carried out while referring to an LUT (look up table). In the tone correction process, the density levels of those color image signals are scaled so as to linearly vary with respect to the luminous efficiency characteristic of a human being. A process of the gray balance adjustment is carried out. In this process, the corrected color image signals Bt, Gt and Rt are adjusted so as to be equal to one another in the achromatic portions of the original color image.

The input color image signals Bt, Gt and Rt, after tone corrected by the correction circuit 210, are inputted to a gray-component extracting unit 220. The gray-component extracting unit 220 extracts a gray component signal Gr from the color image signals Bt, Gt and Rt, and separates remaining-color-component signals Bo, Go and Ro from the color image signals.

The process for the extraction of the gray component signal Gr and the process for the separation of the remaining-color-component signals Bo, Go and Ro are mathematically expressed by the following equations.

$$Gr = \min(Bt, Gt \text{ and } Rt) \tag{1}$$

$$Bo = Bt - Gr \tag{2}$$

$$Go = Gt - Gr \tag{3}$$

$$Ro = Rt - Gr \tag{4}$$

As seen from those equations, the gray component signal Gr is a signal representative of the minimum value of those of the input color image signals Bt, Gt and Rt. The remaining-color-component signals Bo, Go and Ro are respectively expressed by the results of subtracting the gray component signal Gr from the color image signals Bt, Gt and Rt. Those processes are carried out by the gray-component extracting unit 220.

The process of extracting the gray component signal Gr and the process of separating the remaining-color-component signals Bo, Go and Ro belong respectively to the categories of the full black generation and the under color removal. Accordingly, those processes may be realized in other suitable ways. To reproduce a black part, e.g., a black character, in an original color image by only black in the output image, it is preferable to use the called 100% under color removal, which separates black from all of the color components as seen from the equations (1) to (4) above.

The remaining-color-component signals Bo, Go and Ro are applied from the gray-component extracting unit 220 to a coefficient multiplying circuit 231. The coefficient multiplying circuit 231 multiplies the received remaining-color-component signals Bo, Go and Ro by coefficients $\alpha$, $\beta$ and $\gamma$ as given below $$Bk = \alpha \times Bo, \ Gk = \beta \times Go, \ Rk = \gamma \times Ro \tag{5}$$

The coefficient multiplying circuit 231 produce remaining-color-component signals Bk, Gk and Rk. The remaining-color-component signals Bk, Gk and Rk, and the gray component signal Gr are applied to a maximum value extraction circuit 239 in a black signal generating means 230, from the coefficient multiplying circuit 231 and the gray-component extracting unit 220. The maximum value extraction circuit 239, or the black signal generating unit 230, extracts the maximum value from those values of the remaining-color-component signals Bk, Gk and Rk and the gray component signal Gr, and produces the maximum value signal as a black signal K.

The remaining-color-component signals Bo, Go and Ro are applied from the gray-component extracting unit 220 to a coefficient multiplying circuit 241. The coefficient multiplying circuit 241 multiplies the received remaining-color-component signals Bo, Go and Ro by coefficients a, b and c as given below $$B1 = a \times Bo, \ G1 = b \times Go, \ R1 = c \times Ro \tag{6}$$

The coefficient multiplying circuit 241 produce remaining-color-component signals B1, G1 and R1. The remaining-color-component signals B1, G1 and R1 are applied to a maximum value extraction circuit 249 in a color signal generator unit 240. The maximum value extraction circuit 249, or the black signal generator unit 240, extracts the maximum value from those values of the remaining-color-component signals B1, G1 and R1, and produces the maximum value signal as a color signal P1.

The total sum of those coefficients $\alpha$, $\beta$ and $\gamma$, and a, b and c is selected to be approximately 2 so that the density of the original color image is entirely retained in the output image.

The black signal K and the color signal P1 are taken, every frame, out of the black signal generating unit 230 and the color signal generator unit 240, through a select circuit 290, and transferred to an image output unit 300. The take-out operation of those signals is performed in synchronism with a scan cycle in the image input unit 100 and a developing cycle in the image output unit 300. The image output unit 300 prints out an output image of two colors (black and another color), for example, black and red, on a print sheet. Those two colors are determined by the black signal K and the color signal P1.

As referred to above, the input color image signals Bi, Gi and Ri are the negative signals. Accordingly, the corrected color image signals Bt, Gt and Rt, and the remaining-color-component signals Bo, Go and Ro, Bk, Gk and Rk, and B1, G1 and R1 are all the negative signals.

The numerical values of coefficients $\alpha$, $\beta$ and $\gamma$, and a, b and c are specified depending on the colors in the original color image that are converted to black and another color in the output image, under control of a system controller, not shown.

In a specific example, $$\alpha=\beta=0, \gamma=0.5, a=0.5, b=1, \text{ and } c=0 \quad (7)$$

$$Bk=Gk=0, Rk=0.5\times Ro \quad (8)$$

$$B1=0.5\times Bo, G1=Go, \text{ and } R1=0 \quad (9)$$

In this example, the gray component signal Gr or the remaining-color-component signal Rk is converted into black K, and the remaining-color-component signal B1 or G1 is converted into the color signal P1. Black or a family of blue in the original color image is expressed in black in the output image, and a family of red is expressed in any other color than black.

In another example, $$\alpha=0, \beta=0.5, \gamma=0, a=0.5, b=0, \text{ and } c=1 \quad (10)$$

$$Bk=0, Gk=0.5\times Go, Rk=0 \quad (11)$$

$$B1=0.5\times Bo, G1=0, \text{ and } R1=Ro \quad (12)$$

In this example, the gray component signal Gr or the remaining-color-component signal Gk is converted into black K, and remaining-color-component signal B1 or R1 is converted into the color signal P1. Black or a family of red in the original color image is expressed in black in the output image, and a family of blue is expressed in any other color than black.

Further, there is no chance that black and another color are distinctly separated in the output image. In the above cases, the colors between black and a family of red, black and a family of blue, and the families of red and blue in the original color image are respectively expressed in the colors that are continuously varied between black and red, black and blue, and red and blue in the output image. Therefore, even when the original color image is a pictorial image, Such as photograph or a natural image, or an image containing an image area of half tone or where color is continuously varied, the original color image is reproduced in a satisfactory quality. Additionally, the construction of the image processing system is simple because there is no need of determining the colors of the original color image.

Figure 2:
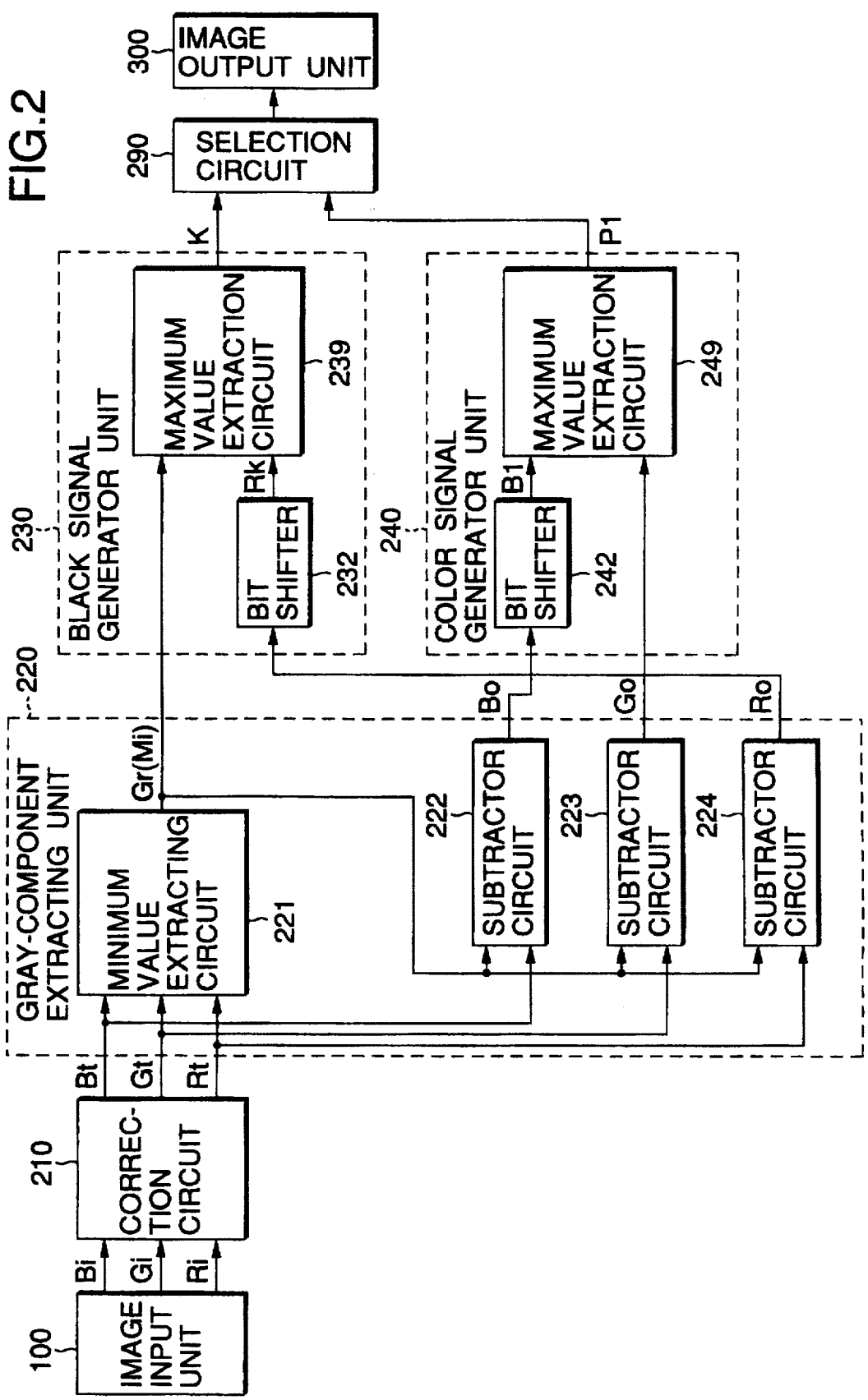
FIG. 2 is a block diagram showing a second embodiment of an image processing system according to the present invention.

FIG. 2 is a block diagram showing a second embodiment of an image processing system according to the present invention, which is incorporated into a digital color copying machine of two color print type, for example, black and red. The image processing system converts a family of red in an original color image into a color except black in an output image.

A gray-component extracting unit 220 is made up of a minimum value extracting circuit 221, and subtractor circuits 222, 223 and 224. The minimum value extracting circuit 221 extracts a signal indicative of the minimum value of those of the corrected color image signals Bt, Gt and Rt that are outputted from the correction circuit 210, and produces it as a gray component signal Gr. The subtractor circuits 222, 223 and 224 subtract the gray component signal Gr from the color image signals Bt, Gt and Rt and produce the results of the subtractions as remaining-color-component signals Bo, Go and Ro.

A black signal generating unit 230 is made up of a bit shifter 232 and a maximum value extraction circuit 239. The bit shifter 232 shifts down the remaining-color-component signal Ro by one bit and produces a remaining-color-component signal Rk (Rk=0.5×Ro) for transfer to the maximum value extraction circuit 239. The maximum value extraction circuit 239 receives the remaining-color-component signal Rk, and the gray component signal Gr from the minimum value extracting circuit 221, and extracts a signal of the maximum value of those of the signals Rk and Gr, and produces it as a black signal K.

A color signal generator unit 240 is made up of a bit shifter 242 and a maximum value extraction circuit 249. The bit shifter 242 shifts down the remaining-color-component signal Bo by one bit and produces a remaining-color-component signal B1 (B1=0.5×Bo) for transfer to the maximum value extraction circuit 249. The maximum value extraction circuit 249 receives the remaining-color-component signal B1, and the gray component signal Go from the subtractor circuit 223, and extracts a signal of the maximum value of those of the signals B1 and Go, and produces it as a color signal P1.

This example corresponds to the example given by the equations (7) to (9). The gray component signal Gr or the remaining-color-component signal Rk is converted into black K, and remaining-color-component signal B1 or Go is converted into the color signal P1. Black or a family of blue in the original color image is expressed in black in the output image, and a family of red is expressed in any other color than black.

The present image processing system have useful effects as the image processing system of the first embodiment. Further, when the print colors in the image output unit 300 are preset, the black signal generating unit 230 and the color signal generator unit 240 are simplified in construction.

Figure 3:
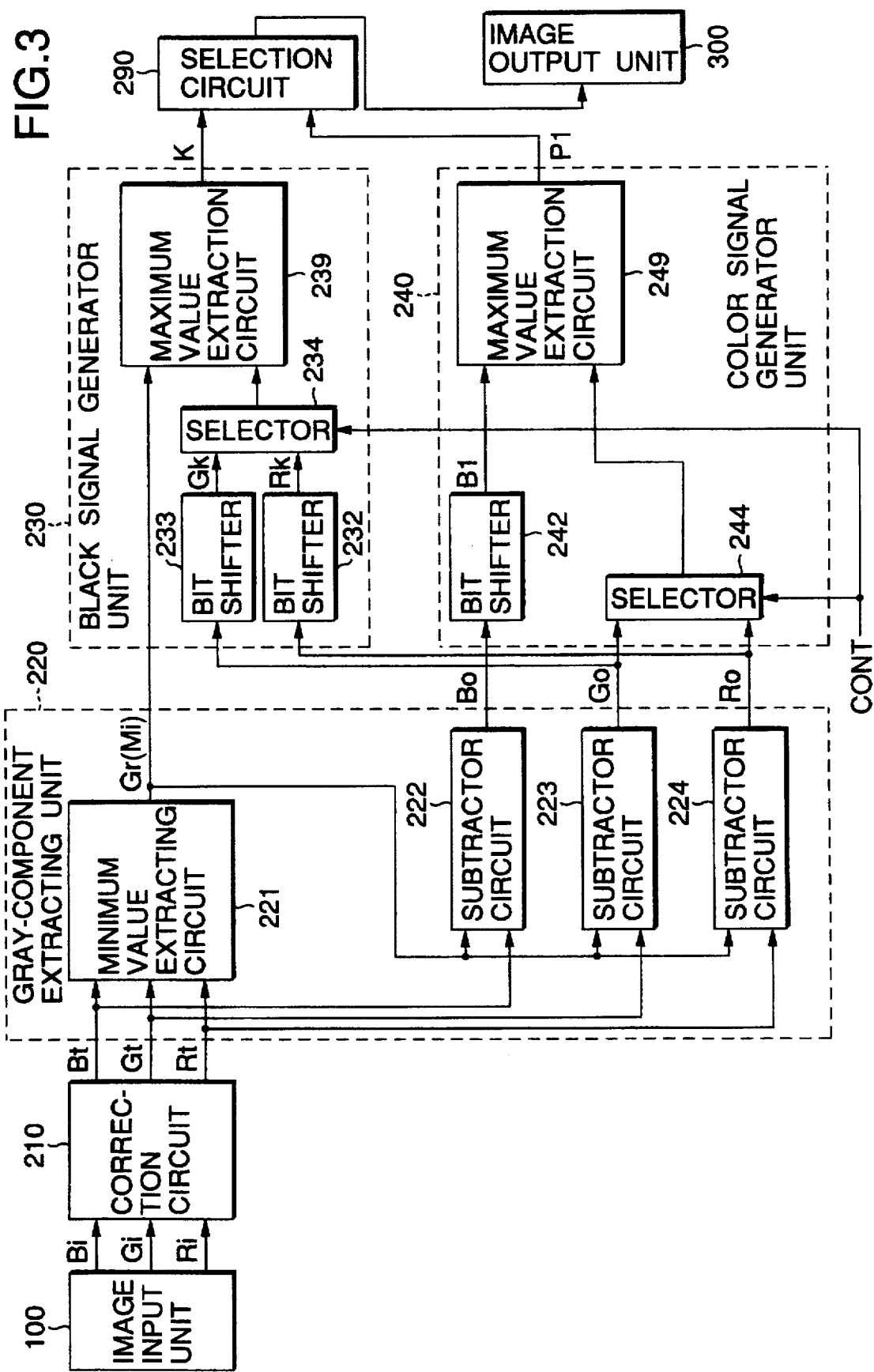
FIG. 3 is a block diagram showing a third embodiment of an image processing system according to the present invention.

FIG. 3 is a block diagram showing a third embodiment of an image processing system according to the present invention, which is incorporated into a digital color copying machine. In the digital copying machine, which is more specific than that of FIG. 1, a family of red or a family of blue in an original color image is selected, and the selected one is expressed by any other color than black in an output image.

A specific construction of the gray-component extracting unit 220 is the same as of the FIG. 2 embodiment. A black signal generating unit 230 is made up of two bit shifters 232 and 233, a selector 234, and a maximum value extraction circuit 239. Each of these bit shifters have substantially the same construction as the bit shifter 232 in FIG. 2. The bit shifter 233 receives the remaining-color-component signal Go from the subtractor circuit 223, shifts it down by one bit, and produces the remaining-color-component signal Gk given by Gk=0.5×Go. The selector 234 selects one of the remaining-color-component signal Gk from the bit shifter 233 and the remaining-color-component signal Rk from the bit shifter 232, in response to a control signal CONT. The maximum value extraction circuit 239 extracts a signal representative of the maximum value of those of the remaining-color-component signal Gk or Rk from the selector 234 and the gray component signal Gr from the minimum value extracting circuit 221, and produces it as a black signal K.

The color signal generator unit 240 is made up of a bit shifter 242, a selector 244 and a maximum value extraction circuit 249. The selector 244 responds to a control signal CONT to select one of the remaining-color-component signal Go from the bit shifter 233 and the remaining-color-component signal Ro from the selector 244, and transfers the selected one to the maximum value extraction circuit 249. The maximum value extraction circuit 249 extracts a signal of the maximum value of those of the remaining-color-component signal Go or Ro and the remaining-color-component signal B1 from the bit shifter 242, and produces it as a color signal P1.

The control signal CONT is supplied from a system controller, not shown. The control signal CONT places the selectors 234 and 244 in one of first and second modes. In the first mode, the selector 234 selects the remaining-color-component signal Rk, and the selector 244 selects the remaining-color-component signal Go. In the second mode, the selector 234 selects the remaining-color-component signal Gk, and the selector 244 selects the remaining-color-component signal Ro.

In the first mode, when selected, the operation mode of the image processing system corresponds to the example of the equations (7) to (9) (FIG. 1). In this mode, the gray component signal Gr or the remaining-color-component signal Rk is converted into black K, and remaining-color-component signal B1 or Go is converted into the color signal P1. Black or a family of blue in the original color image is expressed in black in the output image, and a color of a family of red is expressed in any other color than black. In the second mode, when selected, the operation mode of the image processing system corresponds to the example of the equations (10) to (12) (FIG. 1). In this mode, the gray component signal Gr or the remaining-color-component signal Gk is converted into black K, and remaining-color-component signal B1 or Ro is converted into the color signal P1. Black or a family of red in the original color image is expressed in black in the output image, and a family of blue is expressed in any other color than black.

Accordingly, the first mode is selected for an original color image containing mainly a family of red, and the second mode is selected for an original color image containing mainly a family of blue. Thus, the present image processing system handles a variety of original color images for color conversion, with a simple construction.

Figure 4:
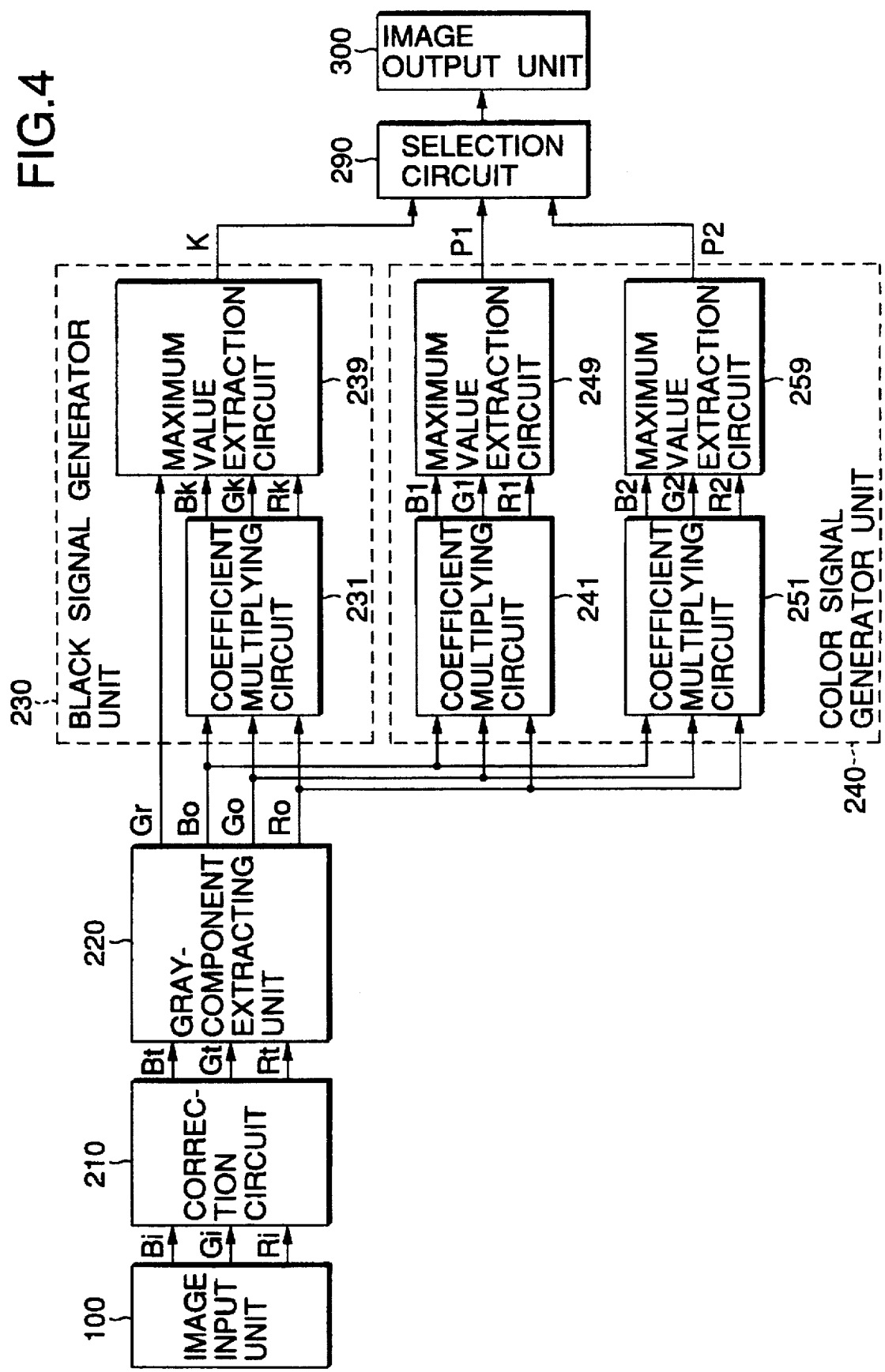
FIG. 4 is a block diagram showing a fourth embodiment of an image processing system according to the present invention, which is incorporated into a digital copying machine of the three-color print type.

FIG. 4 is a block diagram showing a fourth embodiment of an image processing system according to the present invention, which is incorporated into a digital color copying machine of three-color print type. The digital copying machine, when reading an original color image, reproduces it as a color image of three colors, black and other colors, for example, black, red and blue.

An image input unit 100 reads a color image on an original document, to thereby produce input color image signals Bi, Gi and Ri. In this case, the original document is scanned three times, and the input color image signals Bi, Gi and Ri of three frames are produced. A correction circuit 210, a gray-component extracting unit 220, and a black signal generating unit 230 are the same as those of the circuit arrangement of FIG. 1.

The color signal generator unit 240 includes a combination of a coefficient multiplying circuit 241 and a maximum value extraction circuit 249 (as in the FIG. 1) and another combination a coefficient multiplying circuit 251 and a maximum value extraction circuit 259. The first combination produces a color signal P1. The second combination produces a color signal P2.

Remaining-color-component signals Bo, Go and Ro, derived from the gray-component extracting unit 220, are applied to the coefficient multiplying circuit 251 in the color signal generator unit 240. The coefficient multiplying circuit 251 multiples the remaining-color-component signals Bo, Go and Ro by coefficients x, y and z, and produces remaining-color-component signals B2, G2 and R2 given by $$B2 = x \times Bo, \quad G2 = y \times Go, \text{ and } R2 = z \times Ro \tag{13}$$

The remaining-color-component signals B2, G2 and R2 are applied to the maximum value extraction circuit 259. The maximum value extraction circuit 259 extracts a signal of the maximum value of those of the remaining-color-component signals B2, G2 and R2, and produces it as a color signal P2.

The total sum of those coefficients $\alpha$, $\beta$ and $\gamma$, and a, b and c (FIG. 1) and the coefficients x, y and z is selected to be approximately 2 to 3 so that the density of the original color image is entirely retained in the output image.

The black signal K and the color signals P1 are taken, every frame, out of the black signal generating unit 230 and the color signal generator unit 240, through a select circuit 290, and transferred to an image output unit 300. The take-out operation of those signals is performed in synchronism with a scan cycle in the image input unit 100 and a developing cycle in the image output unit 300. The image output unit 300 prints out an output image of three colors (black and other two colors), for example, black, red and blue, on a print sheet. Those three colors are determined on the black signal K and the color signals P1 and P2.

The numerical values of coefficients $\alpha$, $\beta$ and $\gamma$, a, b and c, and x, y and z are specified depending on the colors in the original color image that are converted to black and other colors, i.e., a first color and a second color, in the output image, under control of a system controller, not shown.

In a specific example, $$\alpha = \beta = \gamma = 0, \ a = 0.5, \ b = 1, \text{ and } c = x = y = 0, z = 1 \tag{14}$$

$$Bk = Gk = Rk = 0 \tag{15}$$

$$B1 = 0.5 \times Bo, \ G1 = Go, \text{ and } R1 = 0 \tag{16}$$

$$B2 = G2 = 0, \ R2 = Ro \tag{17}$$

In this example, the gray component signal Gr is converted into black K, and the remaining-color-component signal B1 or G1 is converted into the color signal P1. The remaining-color-component signal R2 is converted into the color signal P2. Black in the original color image is expressed in black in the output image. A family of red in the original color image is expressed in a first color other black, for example, red in the output image. A family of blue in the original color image is expressed in a second color other black, for example, blue in the output image.

The colors between black and a family of red, black and a family of blue, and the families of red and blue in an original color image are respectively expressed in the colors that are continuously varied between black and the first color, black and the second color, and the first and second colors in an output image. Therefore, there is no chance that the colors of black and the first and second colors are distinctively separated in the output image.

Therefore, even when the original color image is a pictorial image, such as photograph or a natural image, or an image containing an image area of half tone or where color is continuously varied, the original color image is reproduced in a satisfactory quality. Additionally, the construction of the image processing system is simple because there is no need of determining the colors of the original color image.

Figure 5:
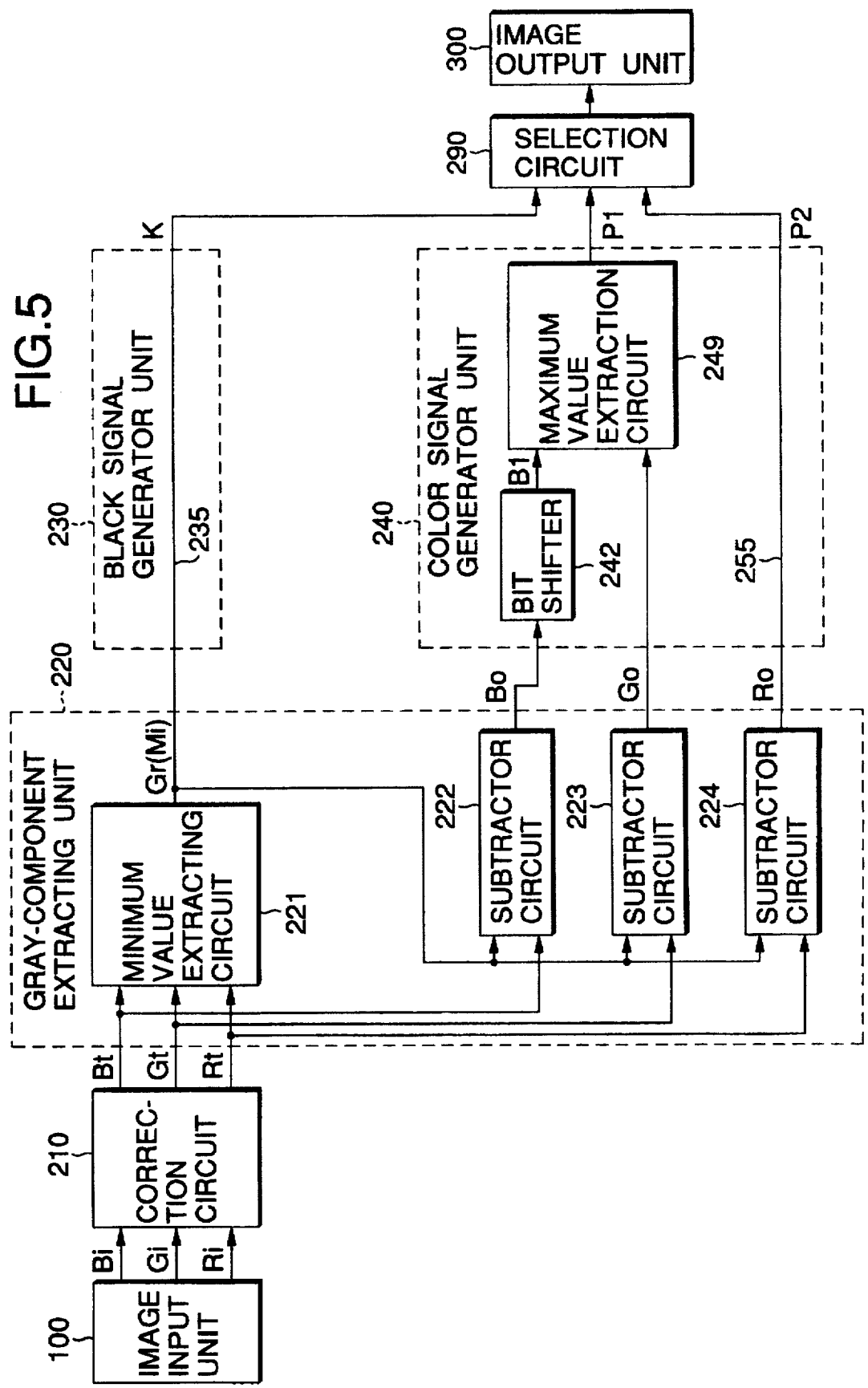
FIG. 5 is a block diagram showing a fifth embodiment of an image processing system according to the present invention.

FIG. 5 is a block diagram showing a fifth embodiment of an image processing system according to the present invention, which is incorporated into a digital color copying machine of the three-color print type. The digital copying machine, which is more specific than that of FIG. 4, reproduces an original color image in three colors of black, red and blue. In the image processing system of the present embodiment, a family of red in the original color image is expressed in a first color other than black in the output image, and a family of blue in the original color image is expressed in a second color other than black in the output image.

The construction of the gray-component extracting unit 220 is the same as that in the image processing system of FIG. 2 or FIG. 3. In the present embodiment, a gray component signal Gr outputted from the minimum value extracting circuit 221 in the gray-component extracting unit 220 is directly used as a black signal K. Therefore, the black signal generating unit 230 contains only an output line 235 led from the minimum value extracting circuit 221.

The color signal generator unit 240 is made up of a bit shifter 242 and a maximum value extraction circuit 249, and an output line 255. The combination of the bit shifter 242 and the maximum value extraction circuit 249 is the same as in the image processing system of FIG. 2, and produces a color signal P1. The output line 255 is led from the subtractor 224 of the gray-component extracting unit 220. The remaining-color-component signal Ro that is outputted from the subtractor 224 is directly outputted as a color signal P2 from the color signal generator unit 240, through the output line 255.

This example corresponds to the example expressed by the equations (14) to (17) in FIG. 4. The gray component signal Gr is converted into black K, and the remaining-color-component signal B1 or Go is converted into the color signal P1. The remaining-color-component signal Ro is converted into the color signal P2. Black in the original color image is expressed in black in the output image. A family of red in the original color image is expressed in a first color other black, for example, red in the output image. A family of blue in the original color image is expressed in a second color other black, for example, blue in the output image.

The present image processing system have useful effects as the image processing system of FIG. 4. Further, when the print colors in the image output unit 300 are preset, the black signal generating unit 230 and the color signal generator unit 240 are simplified in construction.

Figure 6:
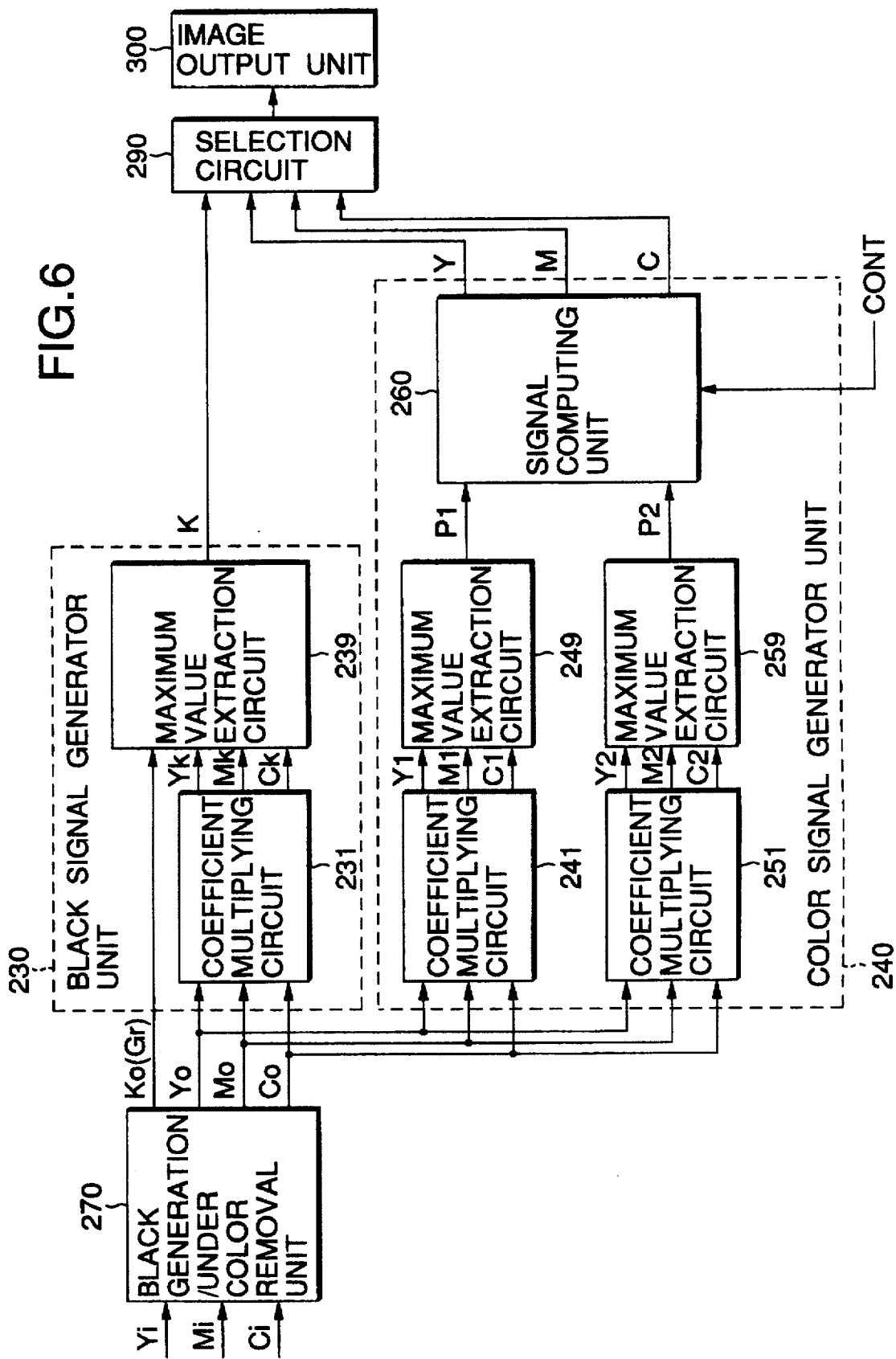
FIG. 6 is a block diagram showing a sixth embodiment of an image processing system according to the present invention.

FIG. 6 is a block diagram showing a sixth embodiment of an image processing system according to the present invention, which is incorporated into a digital color copying machine capable of producing a full-color image using four colors, black, yellow, magenta, and cyan. The digital color copying machine reproduces an original color image in two or three colors, i.e., black and other colors.

The image input unit, not shown, produces input color image signals Yi, Mi and Ci of yellow, magenta and cyan, each consisting of 8 bits. Also in this embodiment, the input color image signals Yi, Mi and Ci are all negative signals. The image input unit scans an original document to gather the input color image signals of four frames.

The input color image signals Yi, Mi and Ci are applied to a black generation/under color removal unit 270 shown in FIGS. 1 to 5. In the full black generation/under color removal unit 270, a full black signal Ko is generated using the input color image signals Yi, Mi and Ci, and under-color removed signals Yo, Mo and Co are produced.

The black generation process and the under color removal process, carried out by the full black generation/under color removal unit 270, are mathematically expressed by $$Ko=min(Yi, Mi, Ci) \quad (18)$$
$$Yo=Yi-Ko \quad (19)$$
$$Mo=Mi-Ko \quad (20)$$
$$Co=Ci-Ko \quad (21)$$

Thus, the under color removal employed here is the called 100% under color removal.

The full black generation/under color removal unit 270 produces a full black signal Ko as a gray component signal Gr and the under color removed signals Yo, Mo and Co as remaining-color-component signals Yo, Mo and Co, which in turn are transferred to a black signal generating unit 230. In the black signal generating unit 230, those signals are processed, as in the case of FIG. 4, into a black signal K.

A coefficient multiplying circuit 231 produces remaining-color-component signals Yk, Mk and Ck given by $$Yk=\alpha \times Yo, Mk=\beta \times Mo, Ck=\delta \times Co \quad (22)$$

A maximum value extraction circuit 239 extracts a signal representative of the maximum value of those of the remaining-color-component signals Yk, Mk and Ck and the gray component signal Gr (full black signal Ko), and outputs it as a black signal K.

The under-color removed signals Yo, Mo and Co are outputted in the form of the remaining-color-component signals, from the full black generation/under color removal unit 270, and transferred to the color signal generator unit 240. In the color signal generator unit 240, the signals P1 and P2 are generated as in the case of FIG. 4.

In the color signal generator unit 240, the coefficient multiplying circuit 241 carries out the following calculations, and produces remaining-color-component signals Y1, M1 and C1 as the results of the calculations to the maximum value extraction circuit 249.

$$Y1=a \times Yo, M1=b \times Mo, C1=c \times Co \quad (23)$$

The maximum value extraction circuit 249 extracts a signal indicative of the maximum value of those of the remaining-color-component signals Y1, M1 and C1, and outputs it as a color signal P1. The coefficient multiplying circuit 251 carries out the following calculations, and produces remaining-color-component signals Y2, M2 and C2 as the results of the calculations to the maximum value extraction circuit 259.

$$Y2=a \times Yo, M2=b \times Mo, C2=c \times Co \quad (24)$$

The maximum value extraction circuit 259 extracts a signal indicative of the maximum value of those of the remaining-color-component signals Y2, M2 and C2, and outputs it as a color signal P2.

The color signals P1 and P2 are outputted from the maximum value extraction circuits 249 and 259 to a signal computing unit 260. The signal computing unit 260 properly processes those signals by a calculation, and produces a yellow signal Y, a magenta signal M, and a cyan signal C.

Figure 7:
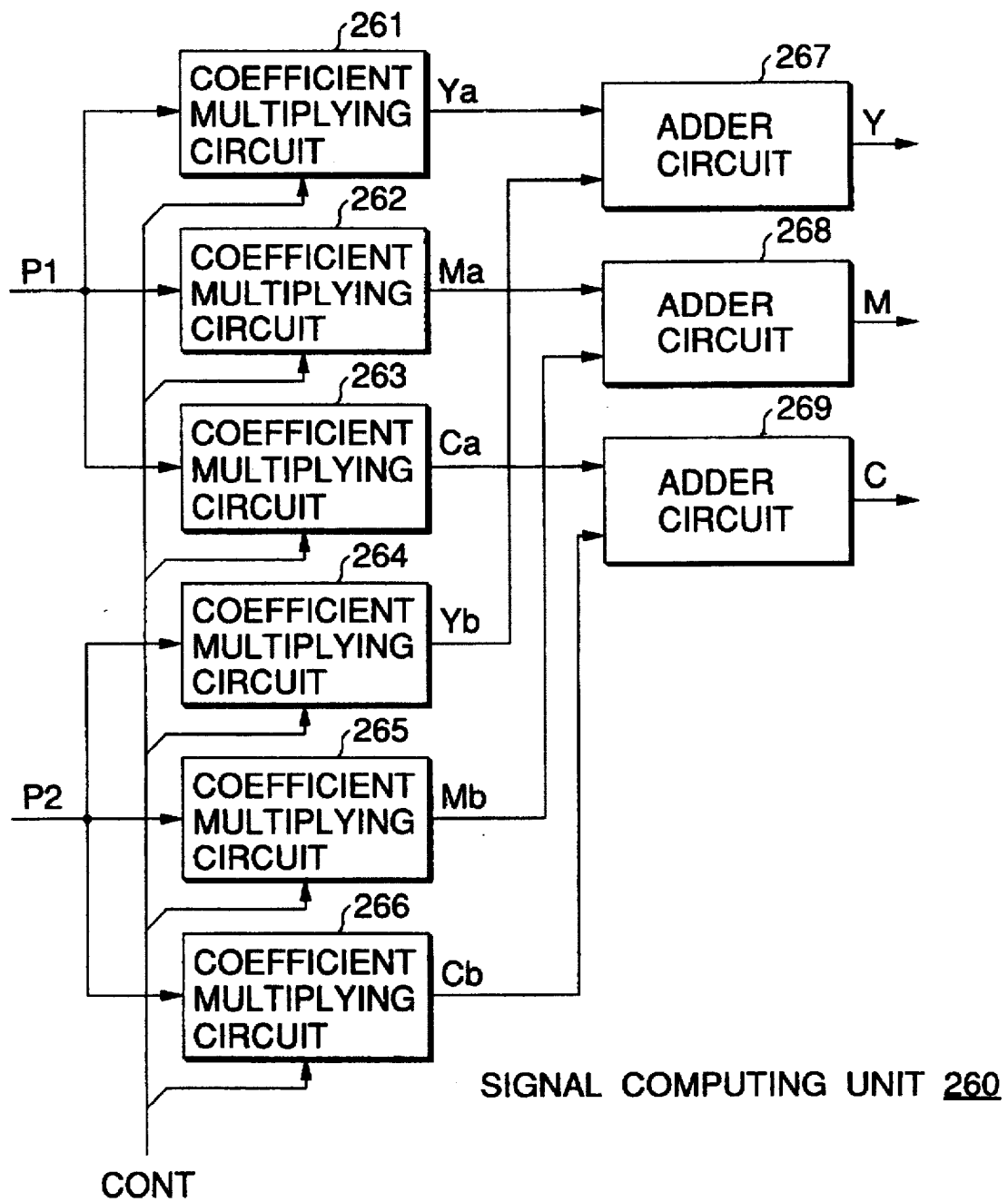
FIG. 7 is a block diagram showing a signal computing unit of the image processing system FIG. 6.

The details of the signal computing unit 260 in the image processing system of FIG. 6 are in block form illustrated in FIG. 7. As shown, the color signal P1 is applied to coefficient multiplying circuits 261, 262 and 263 which in turn multiply the color signal P1 by coefficients e, f and g as given below $$Ya=e \times P1, Ma=f \times P1, Ca=g \times P1 \quad (25)$$

The results of the multiplications are outputted as signals Ya, Ma and Ca.

Similarly, the color signal P2 is applied to coefficient multiplying circuits 264, 265 and 266 which in turn multiply the color signal P2 by coefficients s, t and u as given below $$Ya=s \times P2, Ma=t \times P2, Ca=u \times P2 \quad (26)$$

The results of the multiplications are outputted as signals Yb, Mb and Cb. An adder circuit 267 receives the signals Ya and Yb from the coefficient multiplying circuits 261 and 264, and adds together them to produce a yellow signal Y.

Another adder circuit 268 receives the signals Ma and Mb from the coefficient multiplying circuits 262 and 265, and adds together them to produce a magenta signal M. A further adder circuit 269 receives the signals Ca and Cb from the coefficient multiplying circuits 263 and 266, and adds together them to produce a cyan signal C.

The black signal K, the yellow signal Y, the magenta signal M, and the cyan signal C are taken, every frame, out of the black signal generating unit 230 and the signal computing unit 260 of the color signal generator unit 240, through a select circuit 290, and transferred to an image output unit 300. The take-out operation of those signals is performed in synchronism with a scan cycle in the image input unit 100 and a developing cycle in the image output unit 300. The image output unit 300 properly processes these color signals K, Y, M and C to form a color image on a print sheet as will be described hereinafter.

The numerical values of coefficients α, β and γ, a, b and c, and x, y and z used in the coefficient multiplying circuits 231, 241 and 251 are specified depending on the colors in the original color image that are converted to black and other colors in the output image, under control of a system controller, not shown.

In a specific example, $$\alpha=\beta=0, \gamma=0.5, a=0.5, b=1, c=x=y=z=0 \tag{27}$$

$$Yk=Mk=0, Ck=0.5 \times Co \tag{28}$$

$$Y1=0.5 \times Yo, M1=Mo, C1=0 \tag{29}$$

$$Y2=M2=C2=0 \tag{30}$$

In this example, the gray component signal Gr (full black Ko) is converted into black K, and the remaining-color-component signal Y1 or M1 is converted into the color signal P1. The color signal P2 is zero. Consequently, black or a family of blue in the original color image is expressed in black in the output image. A family of red in the original color image is expressed in any other color than black.

In another example, $$\alpha=\beta=\gamma=0, a=0.5, b=1, c=x=y=0, z=1 \tag{31}$$

$$Yk=Mk=Ck=0 \tag{32}$$

$$Y1=0.5 \times Yo, M1=Mo, C1=0 \tag{33}$$

$$Y2=M2=0, C2=Co \tag{34}$$

In this example, the gray component signal Gr (full black Ko) is converted into black K, and the remaining-color-component signal Y1 or M1 is converted into the color signal P1. The remaining-color-component signal C2 is converted into the color signal P2. Consequently, black in the original color image is expressed in black in the output image. A family of red in the original color image is expressed in a first color than black. A family of blue in the original color image is expressed in a second color than black.

The color signals P1 and P2 determine other colors than black in the output image. To be more exact, those colors in the output image are determined by the coefficients e, f and g in the coefficient multiplying circuits 261, 262 and 263, and the coefficients s, t and u in the coefficient multiplying circuits 264, 265 and 266. The values of those coefficients e, f and g, and s, t and u are determined by a control signal CONT outputted from the system controller.

In a case where $$e=0.5, f=1, g=0 \tag{35}$$

$$Ya=0.5 \times P1, Ma=P1, Ca=0 \tag{36}$$

The color signal P1 provides an orange color in the output image.

In a case where $$s=0, t=0.5, u=1 \tag{37}$$

$$Yb=0, Mb=0.5 \times P2, Cb=P2 \tag{38}$$

The color signal P2 provides a blue in the output image.

The present embodiment have also the useful effects comparable with those of the previous embodiments. Use of the color signal generator unit 240 brings about an additional useful feature. By properly setting the coefficients in the coefficient multiplying circuits 261 to 266 in the signal computing unit 260 of the color signal generator unit 240, the output image may be expressed in a color combination of black and magenta, or black, magenta and cyan, or the like. This feature of the present image processing system is very useful in a case where an image on an original document is a full color image, but a full color image is not required for the output image. That is, the image processing system enables the copying machine to copy original images using a less amount of resource.

In a case that one of colors is used up during the copying operation of a full color image, an output image of black and one or two other colors may be printed out as an substitute for the full color image.

When an image that is expressed in black and red is copied by a full color copying machine, a color irregularity sometimes appears on the output image because of some instability in the image input unit. Such a color irregularity little appears on the output image produced by the digital copying machine of this embodiment since the signals for the images of black and one or two other colors are generated in the image processing system incorporated into the copying machine.

In any of the digital copying machines thus far described, the image input unit 100 scans an original document a plural number of time, thereby producing input color image signals Bi, Gi and Ri or Yi, Mi and Ci of a plural number of frames. The image processing system converts the input color image signals Bi, Gi and Ri or Yi, Mi and Ci into a black signal K and a color signal P1 or color signals P1 and P2, or color signals Y, M and C. Those color signals K and P1 or color signals P1 and P2, or color signals Y, M and C are selectively applied, every frame, to the image output unit 300, through the select circuit 290.The image output unit 300 successively prints an image color by color. As a result, an image of black and one or more colors is printed out.

There is an image output unit of the Xerography type in which coloring materials of red or black are developed depending on charged potentials on a photo receptor, and black and red dots are selectively printed. In the copying machine using such an image output unit, an output image of two colors, black and red, can be formed through one scan by the image input unit and one development by the image output unit. Therefore, the machine can produce images at high speed. The image output unit, because of its printing principle, is incapable of printing the black and tie red dots at the same dot position in superposed fashion.

Embodiments of an image processing system according to the present invention which is incorporated into an image input/output device with an image output device which can print black and color dots but cannot print a black dot and a red dot at the same dot position in superposed fashion, will be described hereinafter.

Figure 8:
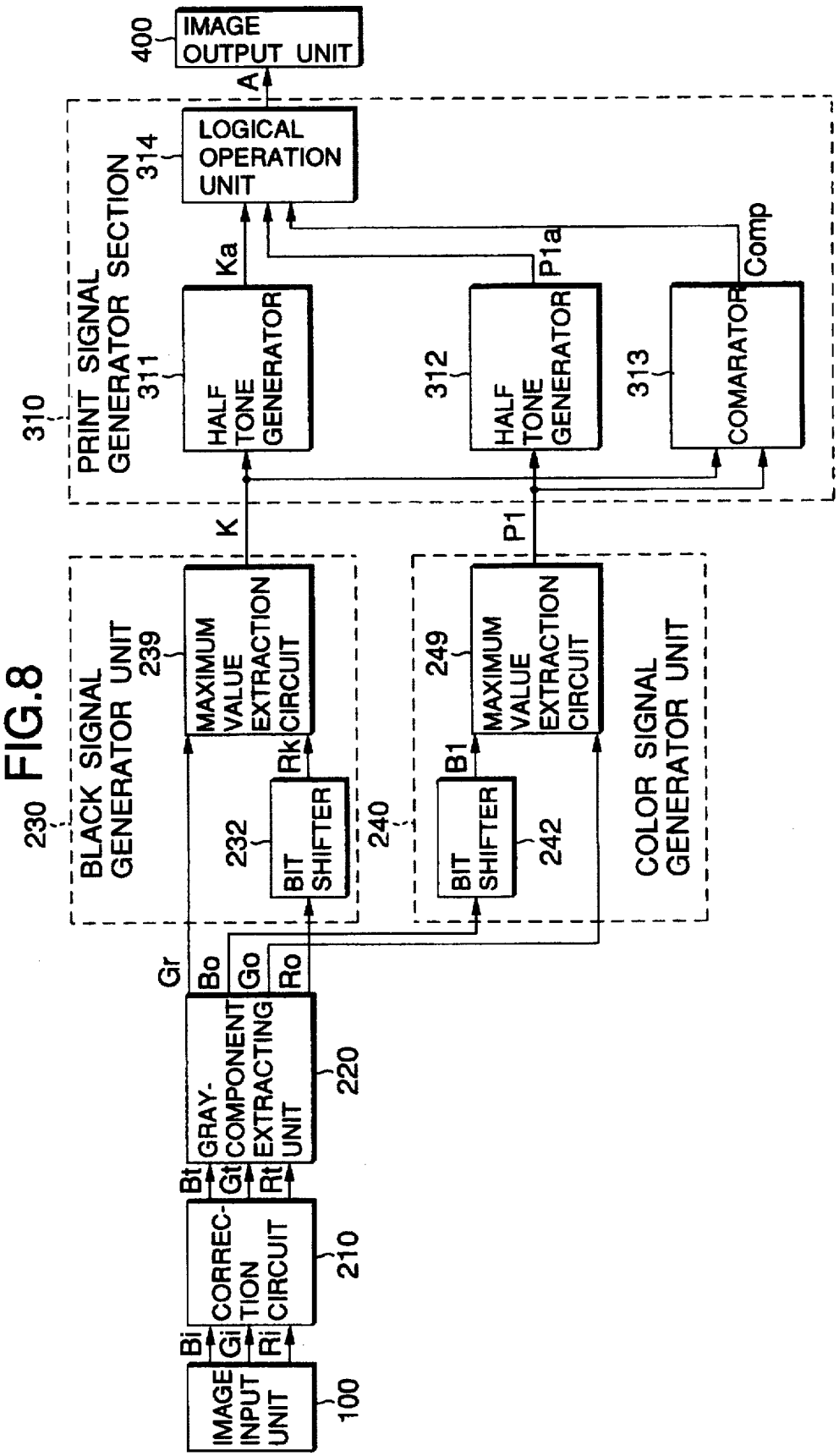
FIG. 8 is a block diagram showing a seventh embodiment of an image processing system according to the present invention.

FIG. 8 is a block diagram showing a digital color copying machine incorporating an image processing system for converting an original color image into an image of a pattern of dots of black and another color and an image output unit 400 which can print black and color dots but cannot print a black dot and a red dot at the same dot position in superposed fashion.

The image input unit 100 scans an original document one time, to thereby produce input color image signals Bi, Gi and Ri of one frame. An image processing system, as in the case of FIG. 2, is made up of a correction circuit 210, a gray-component extracting unit 220, a black signal generating unit 230, a black signal generating unit 230, and a print signal generator section 310.

The print signal generator section 310 is made up of halftone generators 311 and 312, a comparator 313, and a logical operation unit 314. The print signal generator section 310 receives a black signal K from the black signal generating unit 230 and a color signal P1 from the color signal generator unit 240, and generates a print signal indicative of the color, black or another color, of dots printed by the image output unit 400 and a signal to print no dot.

The halftone generator 311 compares a value of a black signal K from the black signal generating unit 230 with dither matrix threshold values to be described later, to thereby generate a binary black signal Ka for black dot print. The halftone generator 312 compares a value of a color signal P1 from the color signal generator unit 240 with dither matrix threshold values to be described later, to thereby generate a binary color signal P1a for color dot print. The comparator 313 compares a value of a black signal K with a value of a color signal P1, and produces a comparison result signal Comp.

A dither pattern of the black signal K and a dither pattern of the color signal P1 are illustrated in FIGS. 10A and 11A. As shown, the dither pattern of a 4×4 matrix is used. To prevent the black dot and the red dots from being printed at the same dot position, the threshold values are arranged in the dither matrices of the black and color signals K and P1 in the following way. In the dither pattern of the black signal K, the threshold values in the peripheral part of the pattern are larger than those in the central part thereof (FIG. 10A). In the dither pattern of the color signal P1, the threshold values in the central part thereof are larger than those in the peripheral part thereof (FIG. 11A).

The black signal K from the black signal generating unit 230 and the color signal P1 from the color signal generator unit 240 are data signals of 8 bit wide. The numerals (for example, "1", "2", . . . "16") in the dither patterns of FIGS. 10A and 11A are the tone levels of the threshold values, not the threshold values.

A black dot pattern of the binary black signal Ka outputted from the halftone generator 311 are formed through the comparison of the black signal K with the dither matrix threshold values in FIG. 10A. In the black dot pattern, the number of black dots (painted black in the drawing) increases as the tone level of the black signal K becomes higher (FIG. 10B). A color dot pattern of the binary color signal P1a outputted from the halftone generator 312 are formed through the comparison of the color signal P1 with the dither matrix threshold values in FIG. 11A. In the color dot pattern, the number of color dots (shaded by slanted lines in the drawing) increases as the tone level of the color signal P1 becomes higher (FIG. 11B).

The logical operation unit 314 operates as shown in a table of FIG. 12. As seen from the table, when the binary black signal Ka and the binary color signal P1a are both in an OFF state, an output signal A as a binary signal of two bits takes a value to print no dot, irrespective of the result of the comparison of the black signal K and the color signal P1. When the binary black signal Ka is in an OFF state and the binary color signal P1a is in an ON state, an output signal A takes a value to print a color dot, irrespective of the result of the comparison of the black signal K and the color signal P1. When the binary black signal Ka is in an ON state and the binary color signal P1a is in an OFF state, an output signal A takes a value to print a black dot, irrespective of the result of the comparison of the black signal K and the color signal P1.

In a state that the binary black signal Ka and the binary color signal P1a are both in an ON state, if the comparison result signal Comp from the comparator 313 shows that the black signal K is equal to or larger than the color signal P1, the output signal A takes a value to print a black dot. In this state, if the black signal K is smaller than the color signal P1, the output signal A takes a value to print a color dot.

Figure 14:
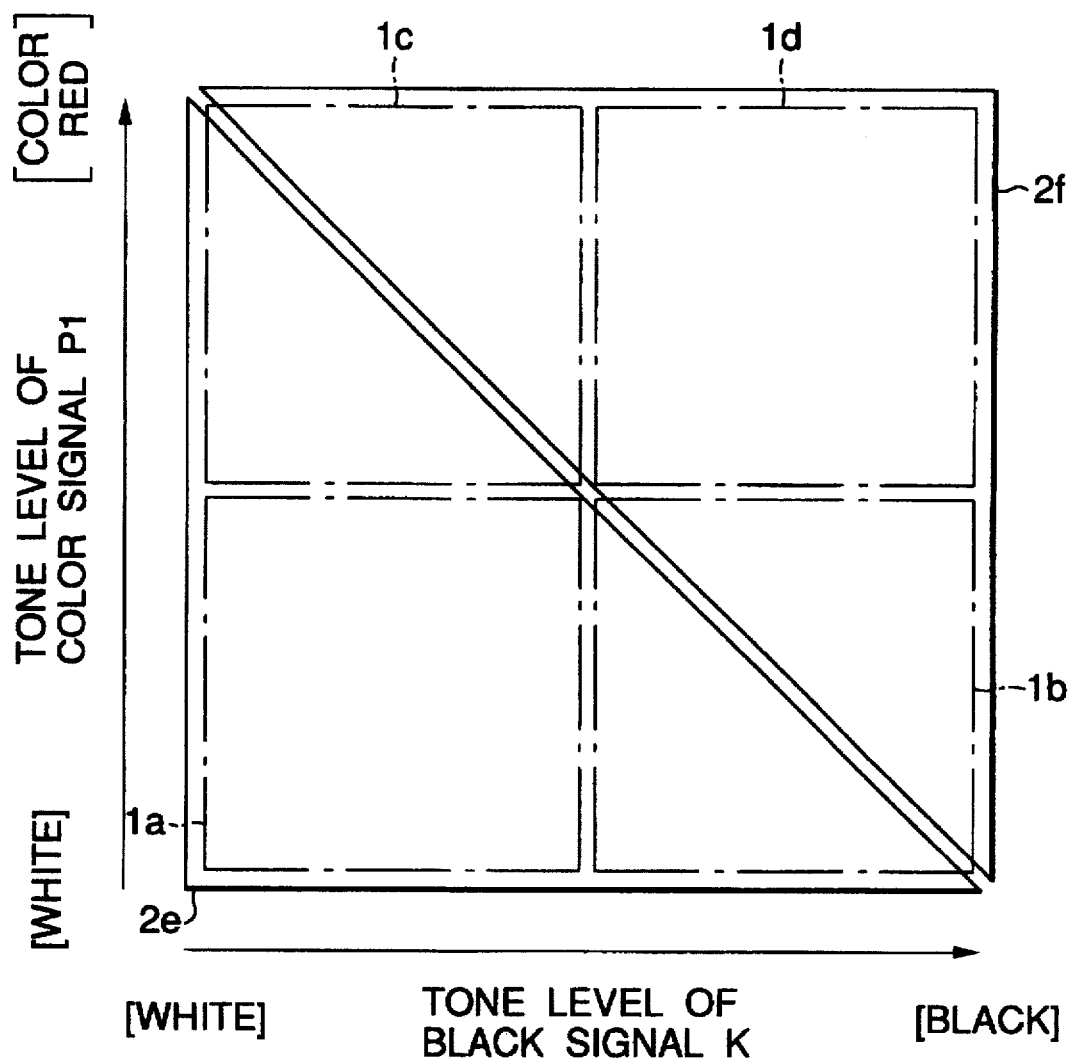
FIG. 14 is a diagram showing a relationship between the tone levels of a black dot and a color dot in the FIGS. 8 and 9 systems, and the overlapping of the black dot with the color dot.
Figure 15:
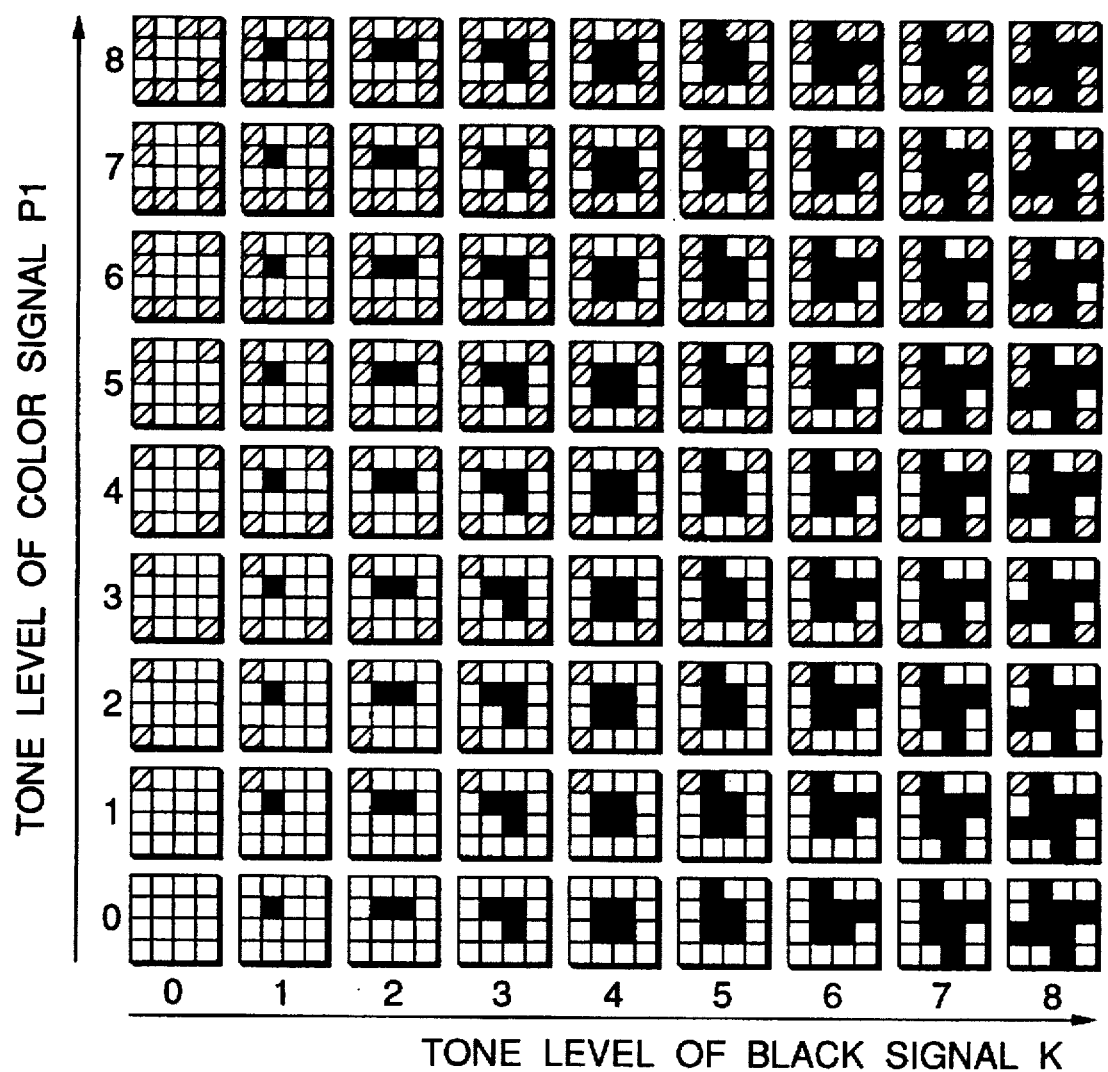
FIG. 15 is a diagram showing the relationship among the tone levels of the black and the color dots, and black dot patterns in the FIG. 8 system.
Figure 16:
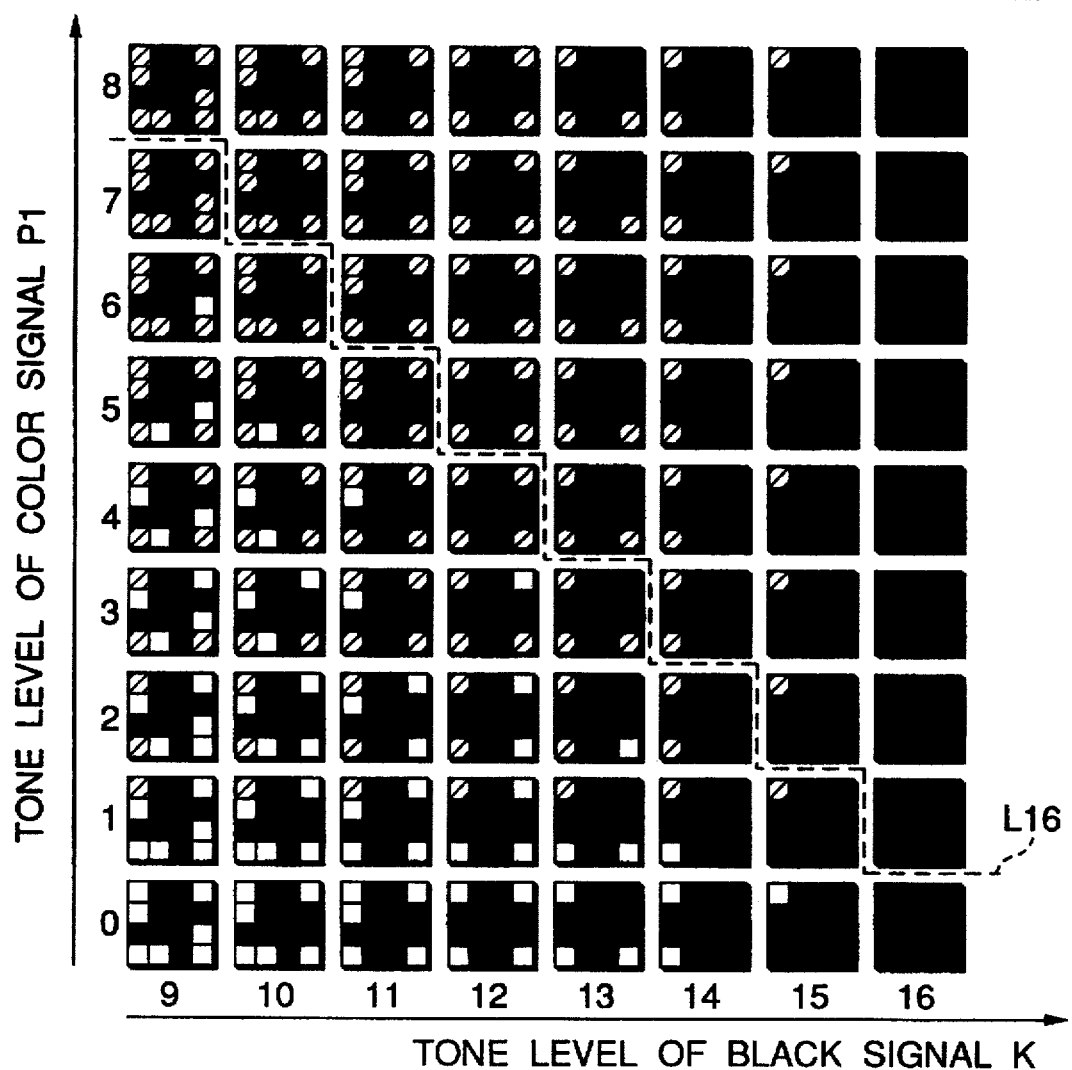
FIG. 16 is a diagram showing the relationship among the tone levels of the black and the color dots, and black dot patterns in the FIG. 8 system.
Figure 17:
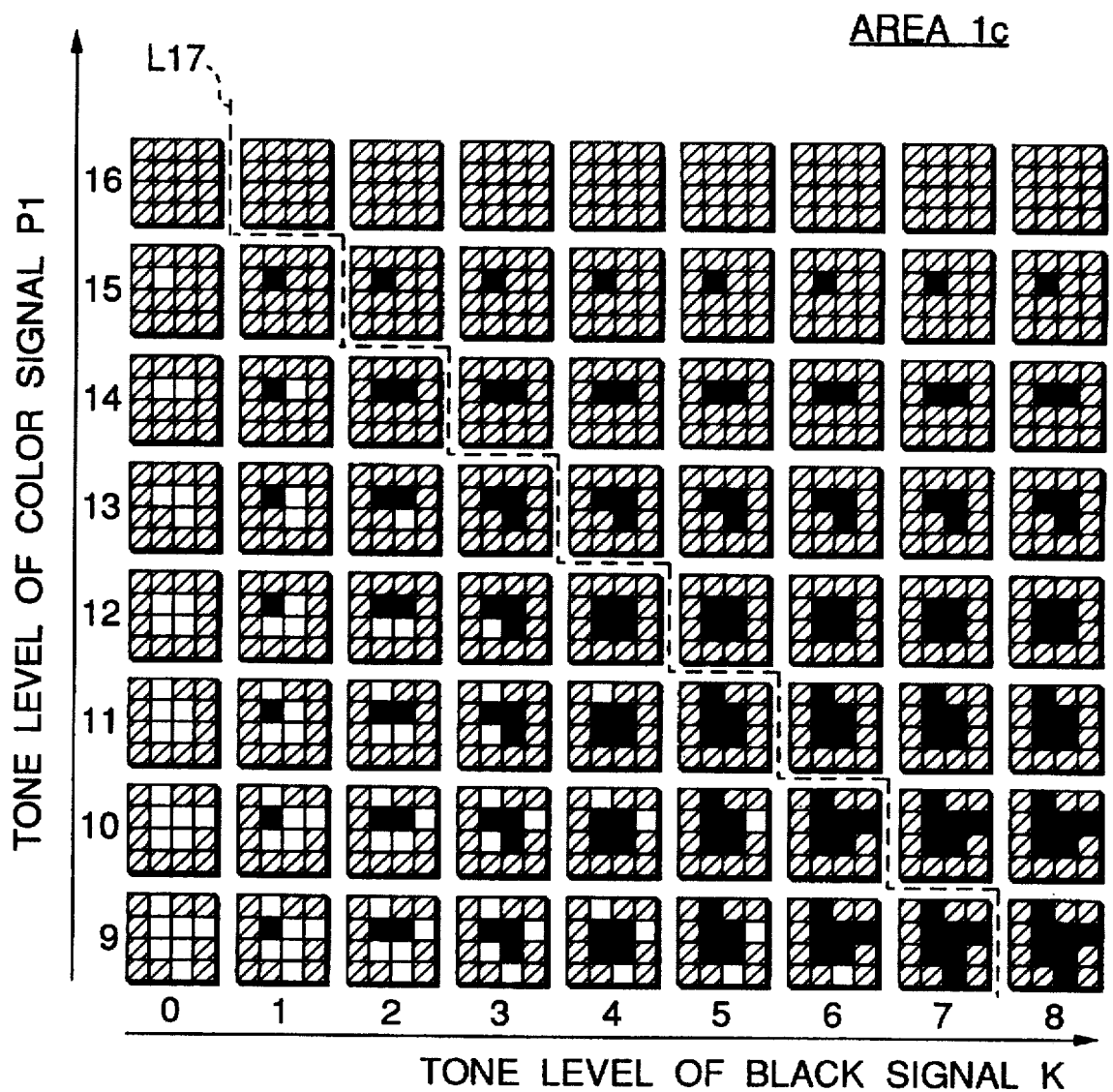
FIG. 17 is a diagram showing the relationship among the tone levels of the black and the color dots, and black dot patterns in the FIG. 8 system.
Figure 18:
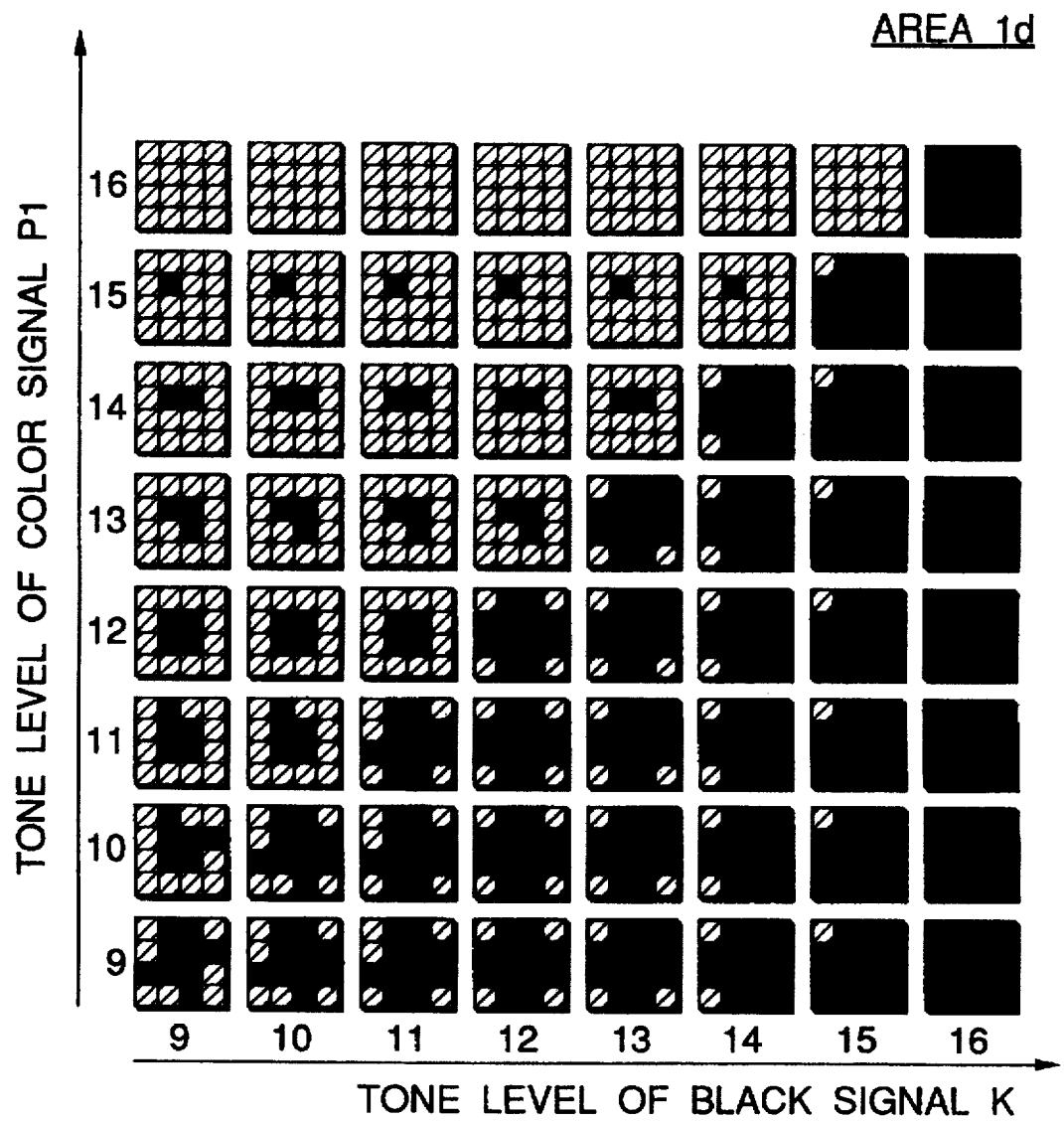
FIG. 18 is a diagram showing the relationship among the tone levels of the black and the color dots, and black dot patterns in the FIG. 8 system.
Figure 19:
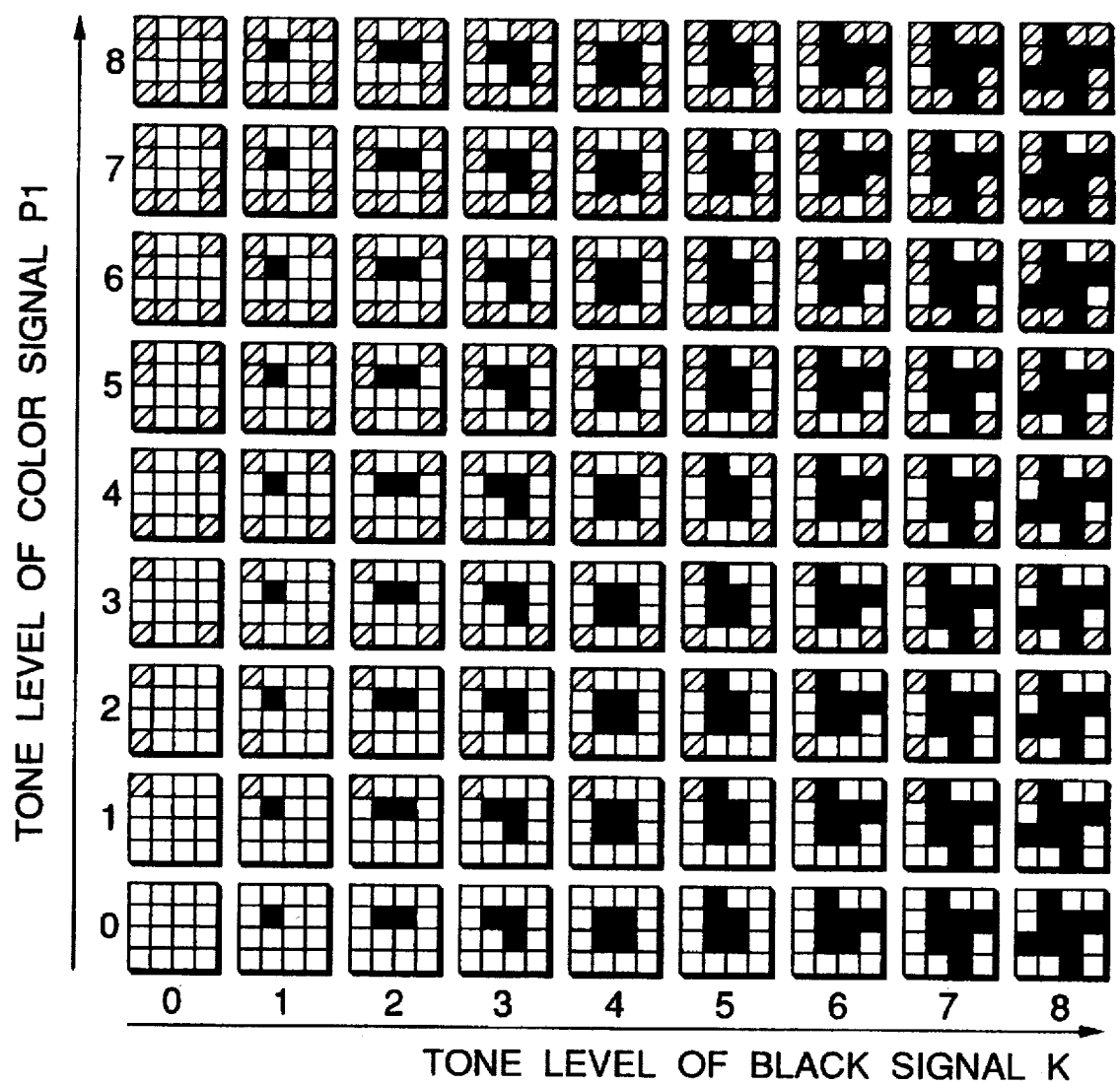
FIG. 19 is a diagram showing the relationship among the tone levels of the black and the color dots, and black dot patterns in the FIG. 9 system.
Figure 20:
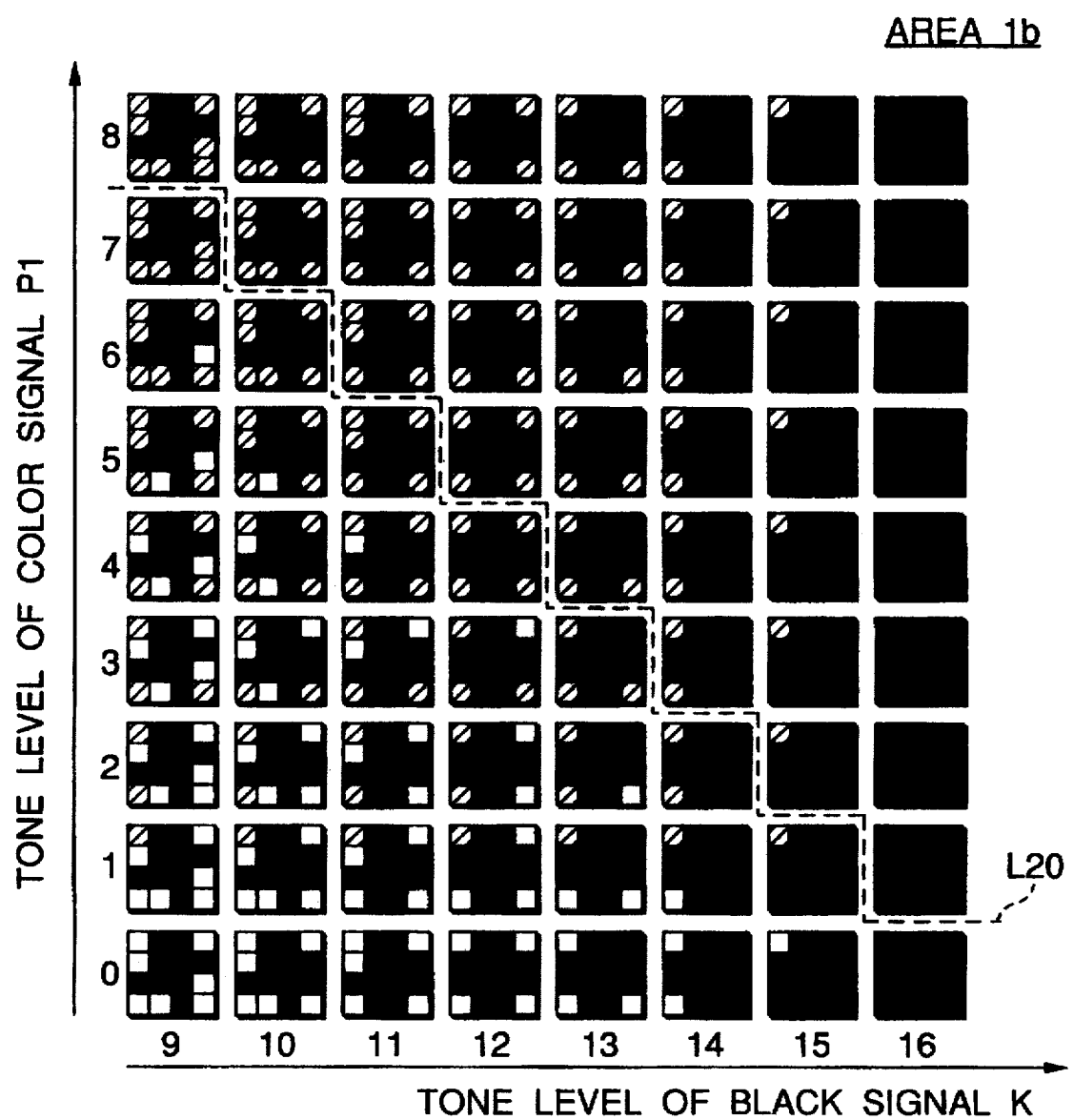
FIG. 20 is a diagram showing the relationship among the tone levels of the black and the color dots, and black dot patterns in the FIG. 9 system.
Figure 21:
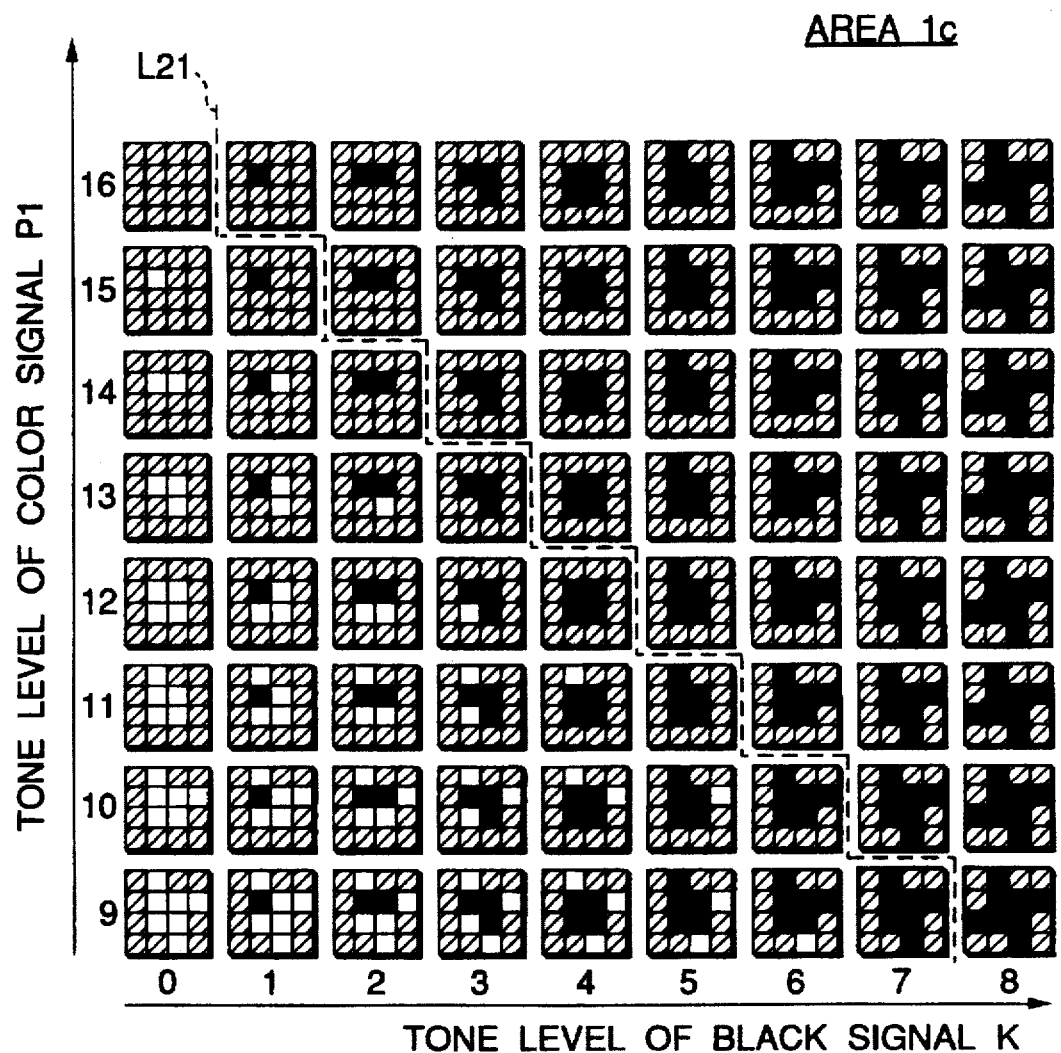
FIG. 21 is a diagram showing the relationship among the tone levels of the black and the color dots, and black dot patterns in the FIG. 9 system.
Figure 22:
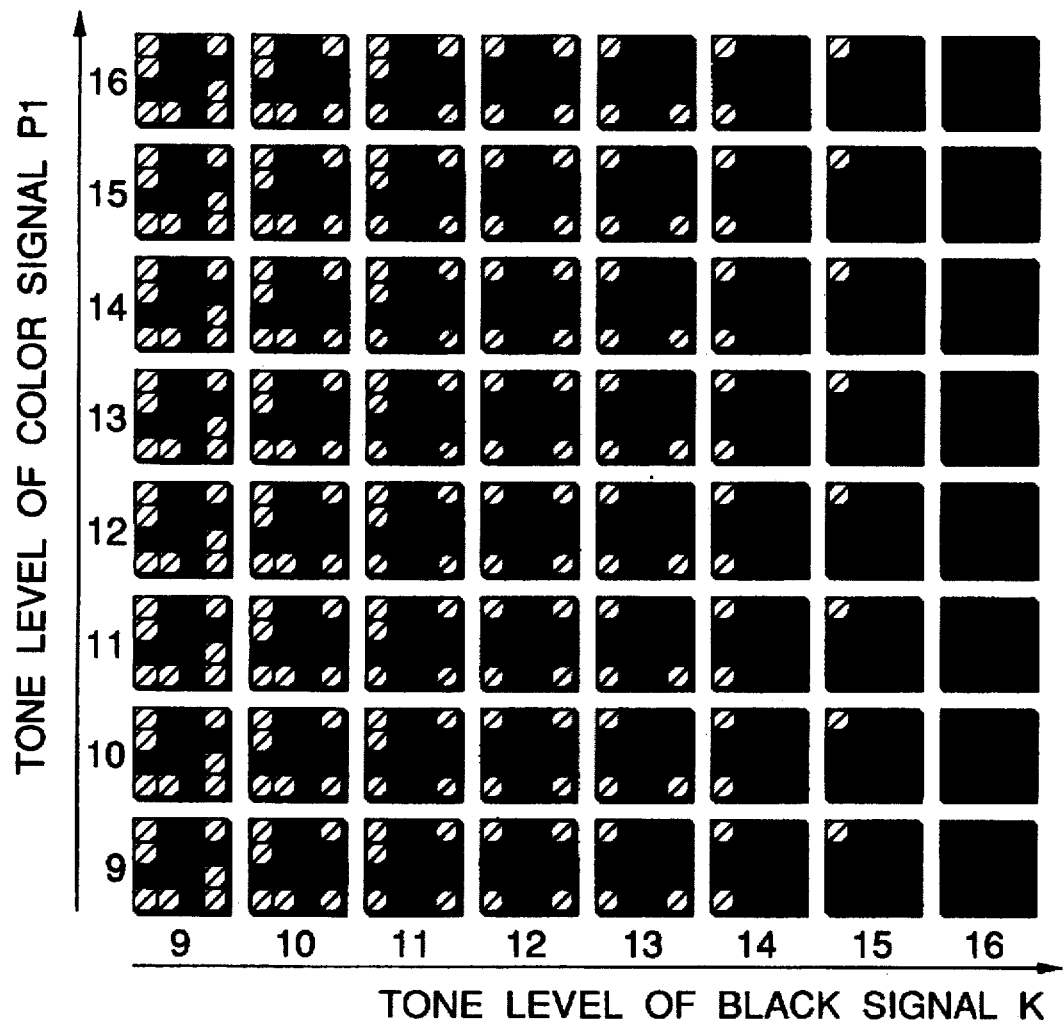
FIG. 22 is a diagram showing the relationship among the tone levels of the black and the color dots, and black dot patterns in the FIG. 9 system.

A case where the binary black signal Ka and the binary color signal P1a are both in an ON state, viz., a case where when the binary black signal Ka and the binary color signal P1a are outputted as the print signals to print the black and the color dots from the print signal generator section 310, the black dot and the color dot are printed at the same dot position in superposed fashion, takes place in the regions. 1*d* and 2*f* in FIG. 14 where the black signal K and the color signal P1 are both high in tone level.

In the region 2*f* (FIG. 14), viz., when the binary black signal Ka and the binary color signal P1a are both in an ON state, the image processing system of FIG. 8 preferentially uses one of the black and the color dots for print depending on the relationship between the black signal K and the color signal P1, to thereby prevent the black and the color dots from occupying the same dot position. A black dot pattern and a color dot pattern in an output image formed by the image output unit 400 vary as shown in FIGS. 15 to 18, in accordance with the tone levels of the black signal K and the color signal P1.

Black and color dot patterns in the regions 1*a* to 1*d* in FIG. 14 are respectively illustrated in FIGS. 15 to 18. In the dot patterns, blocks painted black are black dots, and blocks shaded by slanted lines are color dots (for example, red dots). In FIG. 14, in the region 1*a* the black signal K and the color signal P1 are both low in tone level. In the region 1b, the tone level of the black signal K is high and that of the color signal P1 is low. In the region 1*c*, the tone level of the black signal K is low and that of the color signal P1 is high. In the region 1*d*, the black signal K and the color signal P1 are both high in tone level.

As described above, the black signal K is converted into a binary black signal Ka to form a black dot pattern, 10 and the color signal P1 is converted into a binary color signal P1a to form a color dot pattern. Further, control is carried out so that the black and the color dots do not occupy the same dot position. The image output unit 400, which can print the black and the color dots but cannot print the black and the color dots at the same dot position, can reproduce an original image as a quality image of two colors in which the color between the two colors is continuously varied. Further, the construction of the image processing system is simplified since there is no need of judging the colors of the original color image.

Figure 9:
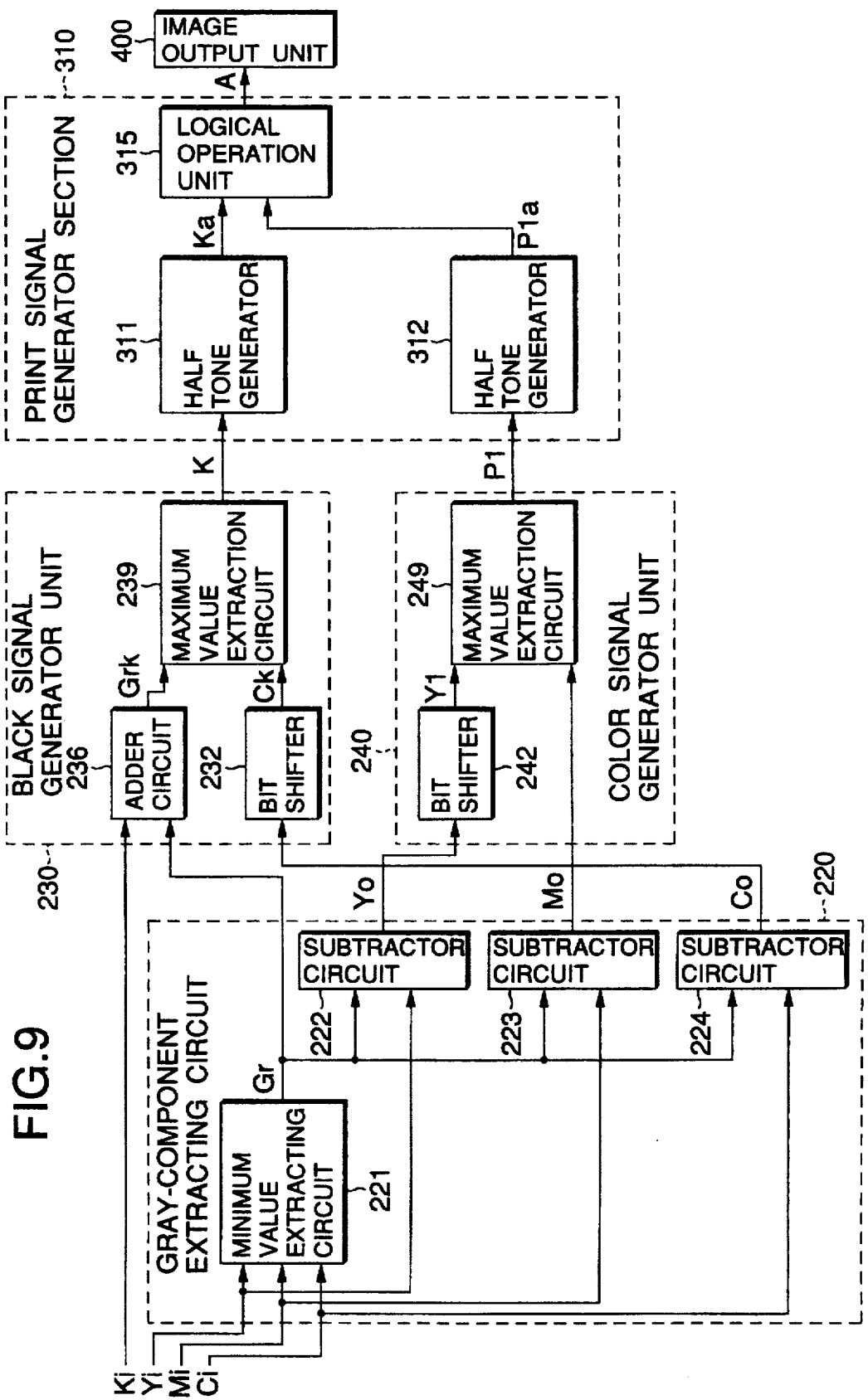
FIG. 9 is a block diagram showing an eighth embodiment of an image processing system according to the present invention.

FIG. 9 is a block diagram showing an eighth embodiment of an image processing system according to the present invention, which is incorporated into an image input/output device which receives a color image expressed in yellow, magenta, cyan and black through a communication network and reproduces the image as an image of a dot pattern of black and another color.

The image input/output device receives an input color image signal consisting of respective color components expressed in terms of digital data. These data signals of the color components of yellow, magenta, cyan and black are denoted as Yi, Mi, Ci and Ki. Of those color component data signals Yi, Mi, Ci and Ki, the signals Yi, Mi and Ci are applied to the gray-component extracting unit 220. The gray-component extracting unit 220 extracts a gray component signal Gr from those signals Yi, Mi and Ci, and at the same time processes the signals Yi, Mi and Ci, and the gray component signal Gr, to thereby produce remaining-color-component signals Yo, Mo and Co.

The gray-component extracting unit 220 is made up of a minimum value extracting circuit 221 and subtractors 222, 223 and 224. The minimum value extracting circuit 221 extracts a signal indicative of a minimum value of those of the signals Yi, Mi and Ci and outputs it as a gray component signal Gr. The subtractors 222, 223 and 224 subtract respectively the gray component signal Gr from the signals Yi, Mi and Ci to produce remaining-color-component signals Yo, Mo and Co.

The black signal generating unit 230 is made up of a bit shifter 232, an adder 236, and a maximum value extraction circuit 239. The bit shifter 232 shifts down by one bit the remaining-color-component signal Co derived from the subtractor 224, and produces a remaining-color-component signal Ck (Ck=0.5×Co). The adder 236 adds together a black signal Ki of the input color image signal and the gray component signal Gr derived from the minimum value extracting circuit 221, and produces a gray signal Grk (Grk=Ki+Gr). The maximum value extraction circuit 239 extracts a signal of the maximum value of those of the remaining-color-component signal Ck and gray signal Grk and produces it as a black signal K.

The color signal generator unit 240 is made up of a bit shifter 242 and a maximum value extraction circuit 249. The bit shifter 242 shifts down the remaining-color-component signal Yo by one bit and produces a remaining-color-component signal Y1 (Y1=0.5×Yo). The maximum value extraction circuit 249 receives the remaining-color-component signal Y1, and the remaining-color-component signal Mo from the subtractor circuit 223, and extracts a signal of the maximum value of those of the signals Y1 and Mo, and produces it as a color signal P1.

The print signal generator section 310 is made up of halftone generators 311 and 312, and a logical operation unit 315. The print signal generator section 310 receives a black signal K from the black signal generating unit 230 and a color signal P1 from the color signal generator unit 240, and generates a print signal indicative of the color, black or another color, of dots printed by the image output unit 400 and a signal to print no dot.

The halftone generator 311 compares a value of a black signal K from the black signal generating unit 230 with dither matrix threshold values (FIG. 10A), to thereby generate a binary black signal Ka for black dot print. The halftone generator 312 compares a value of a color signal P1 from the color signal generator unit 240 with dither matrix threshold values (FIG. 11A), to thereby generate a binary color signal P1a for color dot print.

In a black dot pattern of the binary black signal Ka outputted from the halftone generator 311, the number of black dots (painted black in the drawing) increases as the tone level of the black signal K becomes higher (FIG. 10B). A color dot pattern of the binary color signal P1a outputted from the halftone generator 312, the number of color dots (shaded by slanted lines in the drawing) increases as the tone level of the color signal P1 (FIG. 11B).

The logical operation unit 315 operates as shown in a table of FIG. 13. As seen from the table, when the binary black signal Ka and the binary color signal P1a are both in an OFF state, the output signal A takes a value to print no dot. When the binary black signal Ka is in an OFF state and the binary color signal P1a is in an ON state, the output signal A takes a value to print a color dot. When the binary black signal Ka is in an ON state and the binary color signal P1a is in an OFF state, the output signal A takes a value to print a black dot. When the binary black signal Ka and the binary Color signal P1a are both in an ON state, the black dot is always preferentially used for print and the output signal A takes a value to print a black dot.

A case where the binary black signal Ka and the binary color signal P1a are both in an ON state, viz., a case where when the binary black signal Ka and the binary color signal P1a are outputted as the print signals to print the black and the color dots from the print signal generator section 310, the black dot and the color dot are printed at the same dot position in superposed fashion takes place in a region 2f in FIG. 14, as in the case of FIG. 8.

In the region 2f (FIG. 14), viz., when the binary black signal Ka and the binary color signal P1a are both in an ON state, the image processing system of FIG. 9 always preferentially uses the black dot for print irrespective of the magnitude relationship between the black signal K and the color signal P1, to thereby prevent the black and the color dots from occupying the same dot position. A black dot pattern and a color dot pattern in an output image formed by the image output unit 400 vary as shown in FIGS. 19 to 22, in accordance with the tone levels of the black signal K and the color signal P1.

Black and color dot patterns in the regions 1a to 1d in FIG. 14 are respectively illustrated in FIGS. 19 to 22. In the dot patterns, blocks painted black are black dots, and blocks shaded by slanted lines are color dots (for example, red dots).

Also in this image processing system, as in the image processing system of FIG. 8, the black and the color dots may be printed. The image output unit 400 incapable of printing the black and the color dots at the same dot position, is capable of well reproducing an original color image of two colors, black and another color, in which the color is continuously varied between black and another color, as in the image processing system of FIG. 2.

No difference is present between the image processing systems of FIGS. 8 and 9 in the region 2e of FIG. 14 since in this region, a state that the binary black signal Ka and the binary color signal P1a are simultaneously turned on never happens, and the black dot and the color dot never occupy the same dot position at all. Further, this is confirmed when the whole of FIG. 15, the lower left portion of FIG. 16 with respect to a broken line L16, and the lower left portion of FIG. 17 with respect to a broken line L17 are compared with the whole of FIG. 19, the lower left portion of FIG. 20 with respect to a broken line L20, and the lower left portion of FIG. 21 with respect to a broken line L21.

Let us consider the region 2f in FIG. 14 where a state that the binary black signal Ka and the binary color signal P1a are simultaneously turned on may happen. In this region, the FIG. 8 system selects one of the black dot and the color dot depending on the magnitude relationship between the black signal K and the color signal P1 when the binary black signal Ka and the binary color signal P1a are both turned on. On the other hand, the image processing system of FIG. 9 always selects the black dot when the binary black signal Ka and the binary color signal P1a are both turned on. In this respect, a difference is present between the FIGS. 8 and 9 systems. In the FIG. 8 system, the dot pattern is varied and distinctly separated into black dots and color (e.g., red) dots in accordance with the tone levels of the black signal K and the color signal P1, as seen from the upper right portion of the FIG. 16 with respect to the broken line L16, the upper right portion of FIG. 17 with respect to the broken line L17, and the whole of FIG. 18. In the FIG. 9 system, the dot pattern is varied into black dots and nearblack dots in accordance with the tone levels of the black signal K and the color signal P1, as seen from the upper right portion of the FIG. 20 with respect to the broken line L20, the upper right portion of FIG. 21 with respect to the broken line L21, and the whole of FIG. 22.

When the original color image is an original document with a monochromatic image corrected with a red pencil or marked with a red seal, or a document with an image containing much of characters and lines, such as a business chart, the FIG. 8 system produces a good image free from the unclear, mixed color.

Usually, an image portion where black and color overlap is perceived as black. With this, the tone on the plane of black and another color is retained. For reproducing a natural image or graphics images requiring varied tone, the FIG. 9 system is preferably used.

Figure 23:
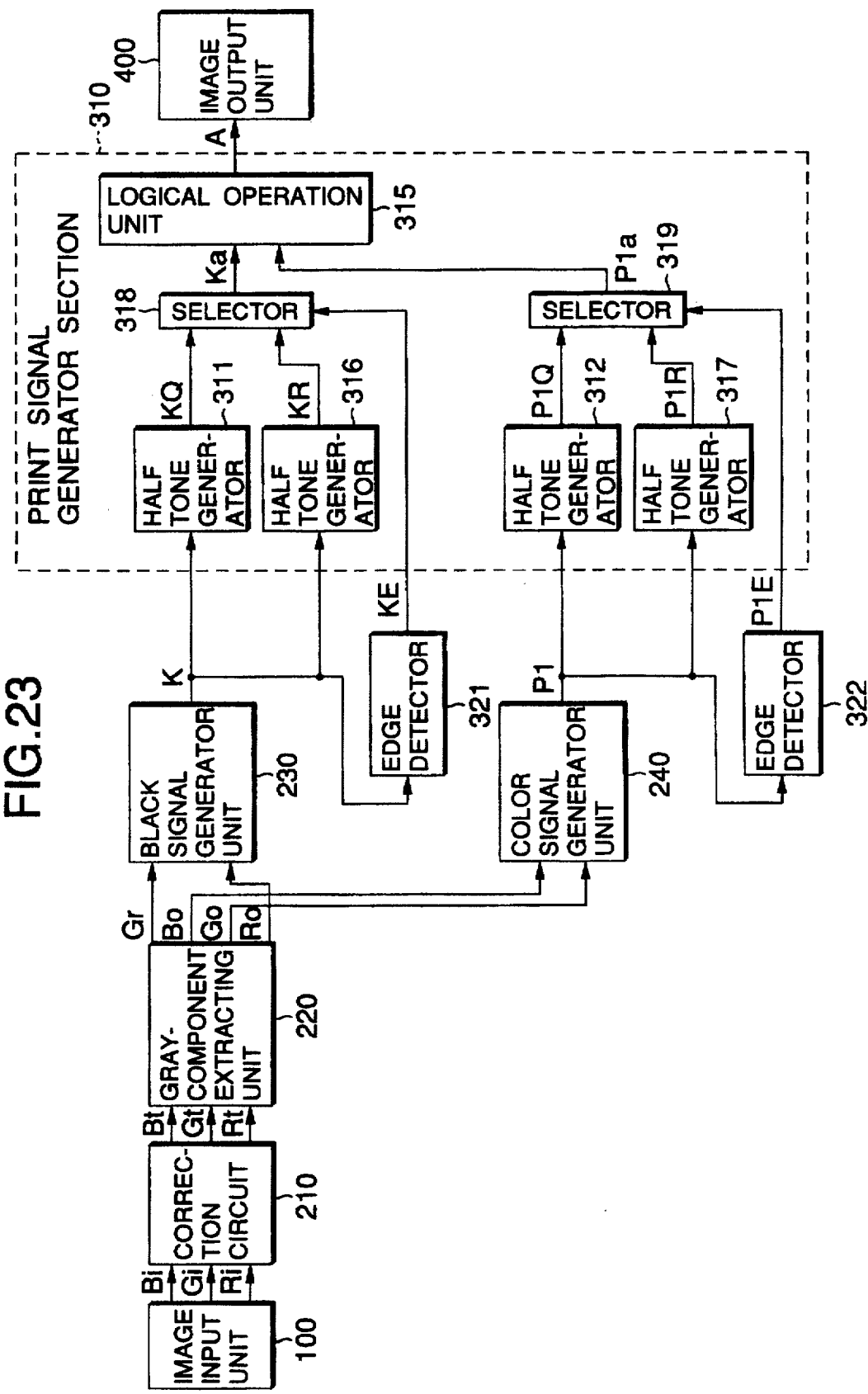
FIG. 23 is a block diagram showing a ninth embodiment of an image processing system according to the present invention.

FIG. 23 is a block diagram showing a ninth embodiment of an image processing system according to the present invention, which is incorporated into an image input/output device. The image processing system forms a dot pattern for a non-edge area on an original color image, and another dot pattern for an edge area thereon.

The present image processing system is made up of a correction circuit 210, a gray-component extracting unit 220, a color signal generator unit 240, an edge detector 321, another edge detector 322, and a print signal generator section 310. The print signal generator section 310 includes a first combination of halftone generators 311 and 316 and a selector 318, a second combination of halftone generators 312 and 317 and a selector 319, and a logical operation unit 315 which is coupled for reception with the selectors 318 and 319.

The edge detector 321 detects an edge portion of a black signal K that is derived from the black signal generating unit 230, by a known process of Laplacian, for example, and produces an edge detect signal KE. The edge detector 322 detects an edge portion of a color signal P1 that is derived from the color signal generator unit 240 by the same known process, and produces an edge detect signal P1E.

The halftone generator 311 compares the black signal K with the dither matrix threshold values as shown in FIG. 10A, to thereby generate a binary black signal KQ for printing black dots. The halftone generator 316 compares the black signal K with a given binarizing threshold value, to thereby generate a binary black signal KR.

The halftone generator 312 compares the color signal P1 with the dither matrix threshold values as shown in FIG. 11A, to thereby generate a binary color signal P1Q for printing color dots. The halftone generator 317 compares the color signal P1 with a given binarizing threshold value, to thereby generate a binary color signal P1R.

In response to an edge detect signal KE from the edge detector 321, the selector 318 operates in the following ways. For the non-edge portion of the black signal K, it selects a binary black signal KQ from the halftone generator 311, and produces a binary black signal Ka for black dot printing. For the edge portion of the black signal K, it selects a binary black signal KR from the halftone generator 316, and produces a binary black signal Ka.

In response to an edge detect signal P1E from the edge detector 322, the selector 319 operates in the following ways. For the non-edge portion of the color signal P1, it selects a binary color signal P1Q from the halftone generator 312, and produces a binary color signal P1a for color dot printing. For the edge portion of the color signal P1, it selects a binary color signal P1R from the halftone generator 317, and produces a binary color signal P1a.

The logical operation unit 315 operates as shown in a table of FIG. 13, as in the FIG. 9 system. As seen from the table, when the binary black signal Ka and the binary color signal P1a are both in an OFF state, the output signal A takes a value to print no dot. When the binary black signal Ka is in an OFF state and the binary color signal P1a is in an ON state, the output signal A takes a value to print a color dot. When the binary black signal Ka is in an ON state and the binary color signal P1a is in an OFF state, the output signal A takes a value to print a black dot. When the binary black signal Ka and the binary color signal P1a are both in an ON state, the black dot is always preferentially used for print and the output signal A takes a value to print a black dot.

In the present image processing system, in the edge area on an original color image, which is detected in the form of an edge part of the black signal K or the color signal P1, the black dot pattern or the color dot pattern is not printed as referred to above, and the pixel is entirely colored with black or another color. With this, printed characters and lines are protected against blur and disconnection. Otherwise, the blur and disconnection of the characters and lines are inevitably caused by the deterioration of the resolution of the output image which arises from the fact that the image output unit 400 cannot print the black and the color dots at the same dot position.

Figure 24:
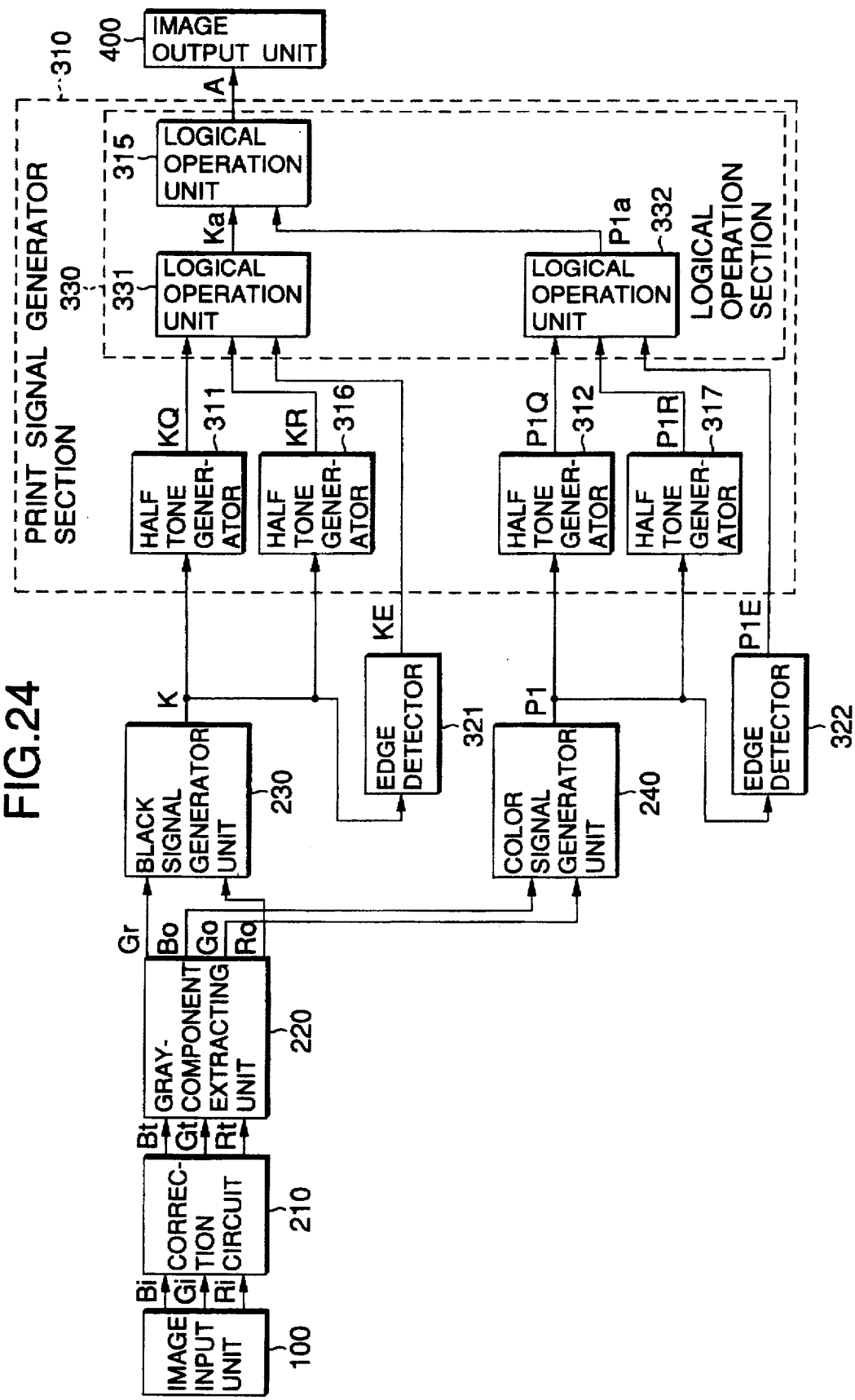
FIG. 24 is a block diagram showing a tenth embodiment of an image processing system according to the present invention.

FIG. 24 is a block diagram showing a tenth embodiment of an image processing system according to the present invention, which is incorporated into an image input/output device. In the image processing system of FIG. 23, the two types of binary signals are selectively used, one for the non-edge area on the original color image, the other for the edge area thereon. In the image processing system of FIG. 24, the logic sum of two types of binary signals is used for a binary signal for dot printing.

In the present image processing system, the print signal generator section 310 includes a couple of halftone generators 311 and 316 for the black signal K and another couple of halftone generators 312 and 317 for the color signal P1, and a logical operation unit 330. The logical operation unit 330 is constructed with three logical operation portions 331, 332 and 315.

The logical operation portion 331 operates as shown in a table of FIG. 25, in response to an edge detect signal KE from the edge detector 321. For the non-edge portion of the black signal K, the binary black signal KQ from the halftone generator 311 is directly outputted as a binary black signal Ka for black dot printing. For the edge portion of the black signal K, the logical sum of the binary black signal KQ from the halftone generator 311 and the binary black signal KR from the halftone generator 316 is outputted as a binary black signal Ka.

The logical operation portion 332 operates as shown in a table of FIG. 25, in response to an edge detect signal P1E from the edge detector 322. For the non-edge portion of the color signal P1, the binary color signal P1Q from the halftone generator 312 is directly outputted as a binary color signal P1a for color dot printing. For the edge portion of the color signal P1, the logical sum of a binary color signal P1Q from the halftone generator 312 and a binary color signal P1R from the halftone generator 317 is outputted as a binary color signal P1a.

The logical operation unit 314 operates as shown in a table of FIG. 13, as in the FIG. 9 system. As seen from the table, when the binary black signal Ka and the binary color signal P1a are both in an OFF state, the output signal A takes a value to print no dot. When the binary black signal Ka is in an OFF state and the binary color signal P1a is in an ON state, the output signal A takes a value to print a color dot. When the binary black signal Ka is in an ON state and the binary color signal P1a is in an OFF state, the output signal A takes a value to print a black dot. When the binary black signal Ka and the binary color signal P1a are both in an ON state, the black dot is always preferentially used for print and the output signal A takes a value to print a black dot.

In the present image processing system, in the edge area on an original color image, which is detected in the form of an edge part of the black signal K or the color signal P1, the logical sum of the two types of binary signals is used as a binary signal for dot printing. With this, printed characters and lines are protected against blur and disconnection. Otherwise, the blur and disconnection of the characters and lines are inevitably caused by the deterioration of the resolution of the output image which arises from the fact that the image output unit 400 cannot print the black and the color dots at the same dot position.

Figure 26:
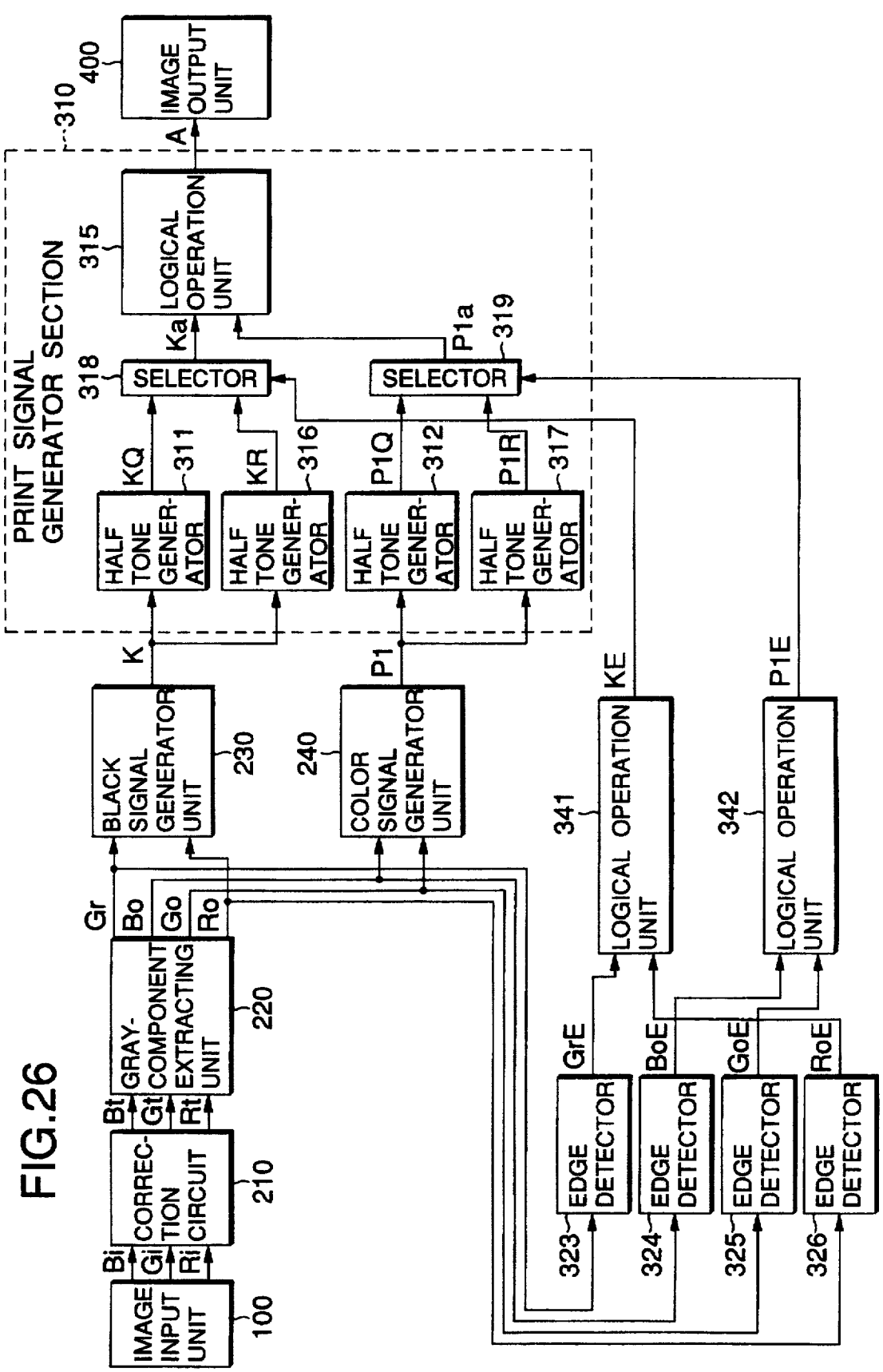
FIG. 26 is a block diagram showing an eleventh embodiment of an image processing system according to the present invention.

FIG. 26 is a block diagram showing of an image input/output device incorporating an image processing system according to an eleventh embodiment of the present invention. The image processing system shown in FIG. 26 corresponds to the image processing system shown in FIG. 23 modified such that the edge areas on the original color image are detected from the gray component signal Gr and the remaining-color-component signals Bo, Go and Ro, which are used for generating the black signal K and the color signal P1.

In the image processing system, edge detectors 323 to 326 receive the gray component signal Gr from the gray-component extracting unit 220, and the remaining-color-component signals Bo, Go and Ro therefrom, process those signals by a known process of Laplacian, for example, to detect the edge parts thereof, and produce edge detect signals GrE, and BoE, GoE and RoE.

The black signal generator 230 receives a gray component signal Gr and the remaining-color-component signal Ro, and processes these signals to generate a black signal K. A logical-sum operation portion 341 logically sums the edge detect signals GrE and RoE derived from the edge detectors 323 and 326, and produces the resultant logical sum as an edge detect signal KE of the black signal K. The color signal generator unit 240 receives the remaining-color-component signals Bo and Go from the gray-component extracting unit 220, and processes these signals to generate a color signal P1. The logical-sum operation portion 342 logically sums the edge detect signals BoE and GoE derived from the edge detectors 324 and 325, and produces the resultant logical sum as an edge detect signal P1E of the color signal P1. Those edge detect signals KE and P1E are applied to the selectors 318 and 319 in the print signal generator section 310.

As described above, in the present embodiment, the gray component signal Gr and the remaining-color-component signals Bo, Go and Ro, which are used for generating the black signal K and the color signal P1, are used for detecting the edge areas on the original color image. Therefore, the image processing system of the present embodiment can detect the edge areas of the remaining-color-components, such as yellow and cyan, which less contribute to the generation of the black signal K and the color signal P1. The image processing system reliably prevents color characters and lines from being blurred and disconnected.

Figure 27:
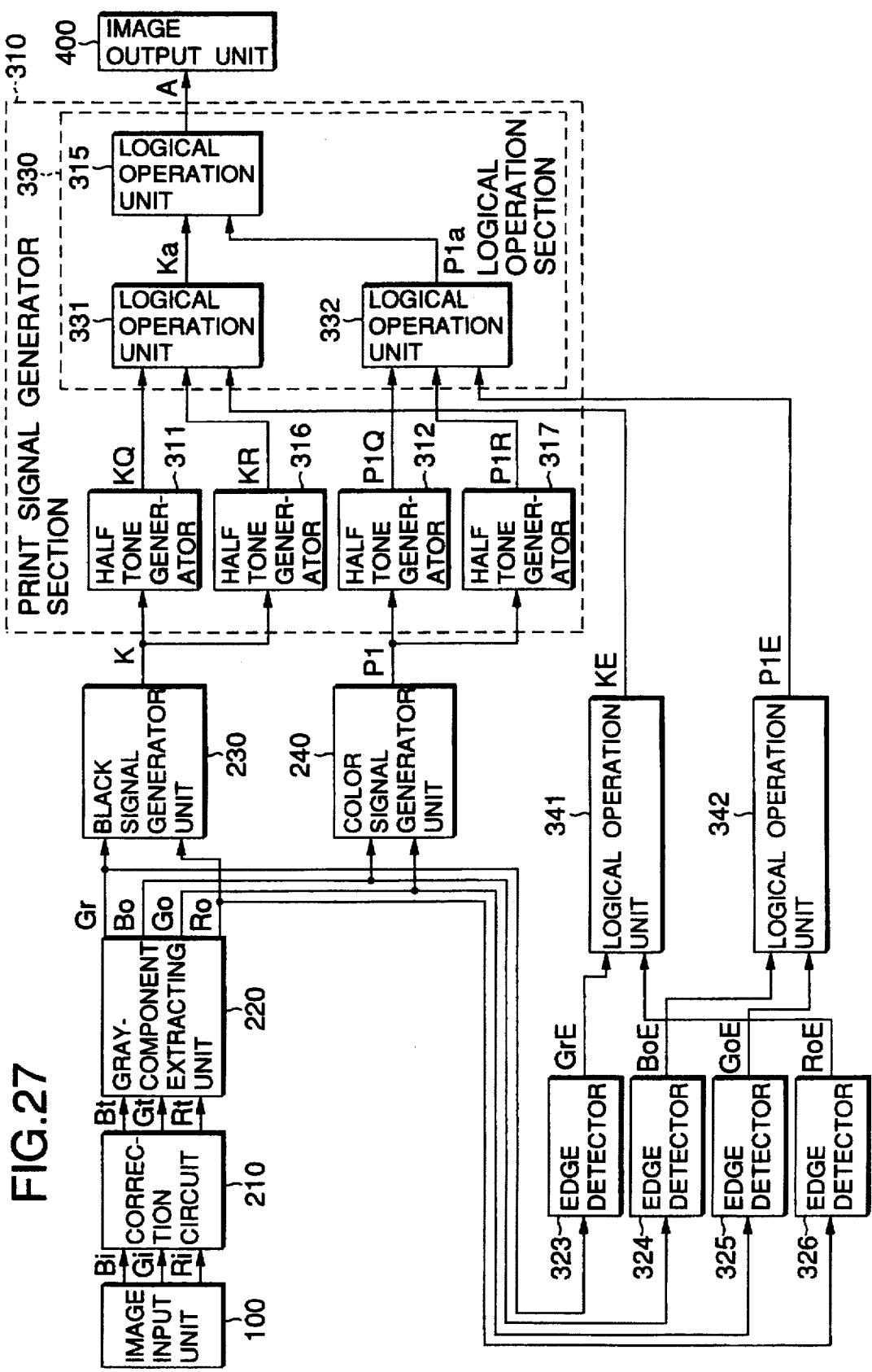
FIG. 27 is a block diagram showing a twelfth embodiment of an image processing system according to the present invention.

FIG. 27 is a block diagram showing of an image input/output device incorporating an image processing system according to an twelfth embodiment of the present invention. The image processing system shown in FIG. 27 corresponds to the image processing system shown in FIG. 24 modified such that the edge areas on the original color image are detected from the gray component signal Gr and the remaining-color-component signals Bo, Go and Ro, which are used for generating the black signal K and the color signal P1 as in the embodiment of FIG. 26. The image processing system of FIG. 27 has the useful effects comparable with those of the FIG. 26 system.

In the image processing systems of FIGS. 23, 24, 26, and 27, the halftone generators in the print signal generator section 310 may be arranged such that the halftone generators 311 and 312 binarize the black signal K and the color signal P1 by comparing them with the threshold values of the 4×4 dither matrices (FIGS. 10A and 11A), as in the image processing systems described above, and the halftone generators 316 and 317 binarize the black signal K and the color signal P1 by comparing them with the threshold values of 2×2 dither matrices (while the binarizing process is used by those halftone generators in the above-mentioned image processing systems). All a designer has to do is to design the halftone generators 311 and 312 so as to carry out some binary process that preferentially handles the number of tones, and to design the halftone generators 316 and 317 so as to carry out some binary process that preferentially handles the resolution.

Figure 28:
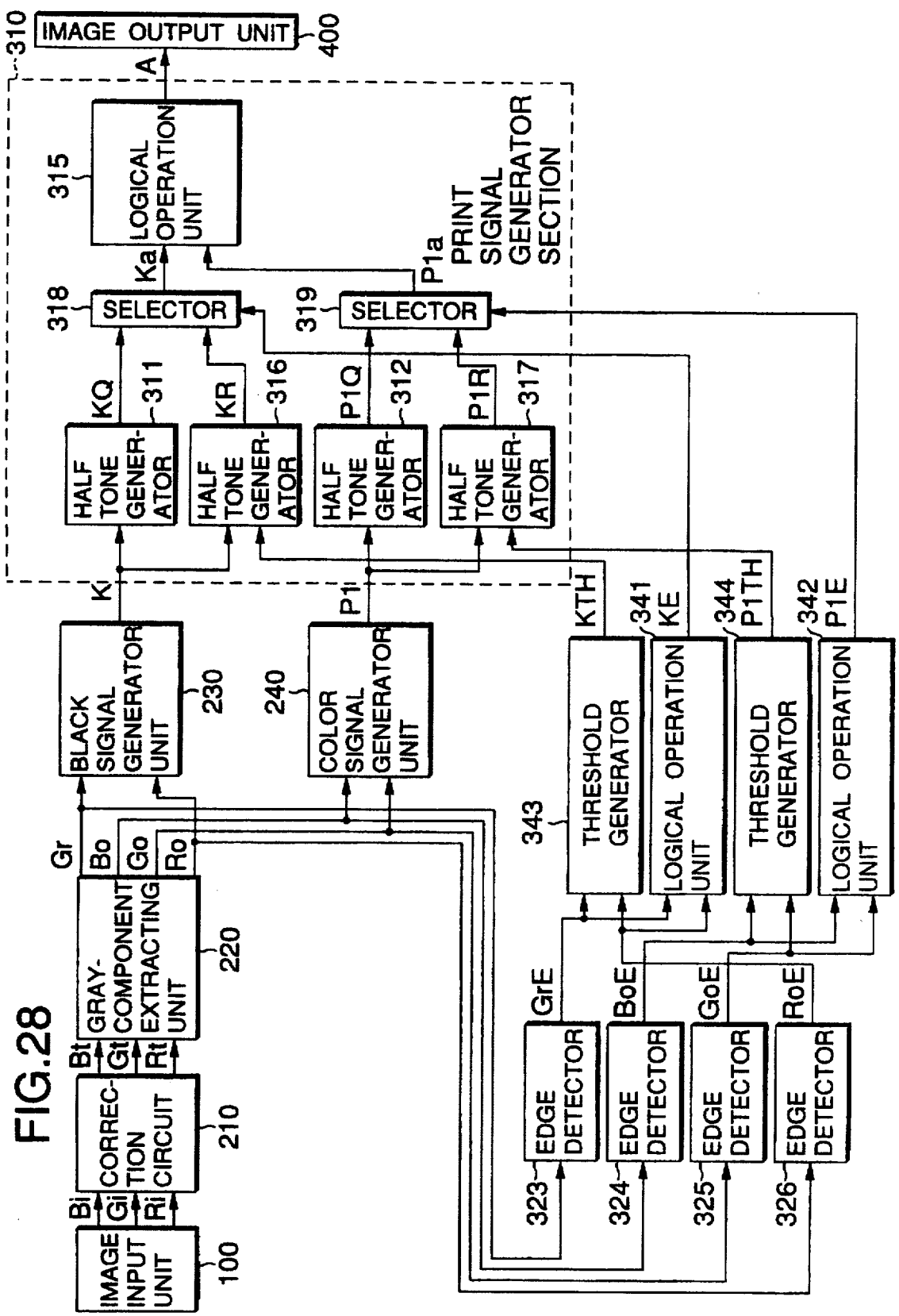
FIG. 28 is a block diagram showing a thirteenth embodiment of an image processing system according to the present invention.

FIG. 28 is a block diagram showing of an image input/output device incorporating an image processing system according to an thirteenth embodiment of the present invention. The image processing system shown in FIG. 28 corresponds to the image processing system shown in FIG. 26 improved in the reproduction at the edge areas of the remaining-color-components of yellow, cyan and things, which less contribute to the generation of the black signal K and the color signal P1.

As seen from the figure, threshold generators 343 and 344 are additionally used in the print signal generator section 310 of the image processing system of FIG. 26. These threshold generators 343 and 344 generate the binarizing threshold values for the halftone generators 316 and 317.

The threshold generator 343 generates a threshold value KTH given by the following equation $$KTH = \max(DTH \times GrE, DTH \times 0.5 \times RoE) \quad (39)$$

In the above equation, GrE and RoE are the edge detect signals derived from the edge detectors 323 and 326. These signals GrE and RoE are each "0" in the non-edge parts of the gray component signal Gr and the remaining-color-component signal Ro, and "1" in the edge parts thereof. The reason why the edge detect signal RoE is multiplied by 0.5 is that the remaining-color-component signal Ro is shifted down one bit in the black signal generating unit 230 (FIG. 8). DTH indicates a threshold value of default.

The threshold generator 344 generates a threshold value P1TH given by the following equation $$P1TH = \max(DTH \times GoE, DTH \times 0.5 \times BoE) \quad (40)$$

In the above equation, BoE and GoE are the edge detect signals derived from the edge detectors 324 and 325. These signals GoE and BoE are each "0" in the non-edge parts of the remaining-color-components Go and Bo, and "1" in the edge parts thereof. The reason why the edge detect signal BoE is multiplied by 0.5 is that the remaining-color-component signal Bo is shifted down one bit in the color signal generator unit 240 (FIG. 8). DTH indicates a threshold value of default.

The threshold values KTH and P1TH, derived from the threshold generators 343 and 344, are supplied to the halftone generators 316 and 317. The threshold values KTH and P1TH are used as binarizing threshold values for generating binary black signals KR and P1R using the black signal K and the color signal P1.

With regard to the edge areas of an original color image where the binary black signal KR from the halftone generator 316 and the binary color signal P1R from the halftone generator 317 are selected in the form of the binary black signal Ka and the binary color signal P1a, the binarizing threshold values KTH and P1TH in the halftone generators 316 and 317 in the edge areas of the remaining-color-components of yellow, cyan and the like, which less contribute to the generation of the black signal K and the color signal P1 may be reduced to be lower than those in the edge areas of black, cyan and the like, which more contribute to the generation of the black signal K and the color signal P1. Therefore, the present image processing system can well reproduce characters and lines of yellow, cyan and the like as well as those of black, magenta, and like.

When characters and lines, both being thin, are reproduced, color information of those characters and lines is lost but the legibleness of them is retained. In the case of image elements of relatively large size, such as characters for captions, color information in the non-edge area is retained. This feature is well adaptable for the reproduction of characters and lines.

Figure 29:
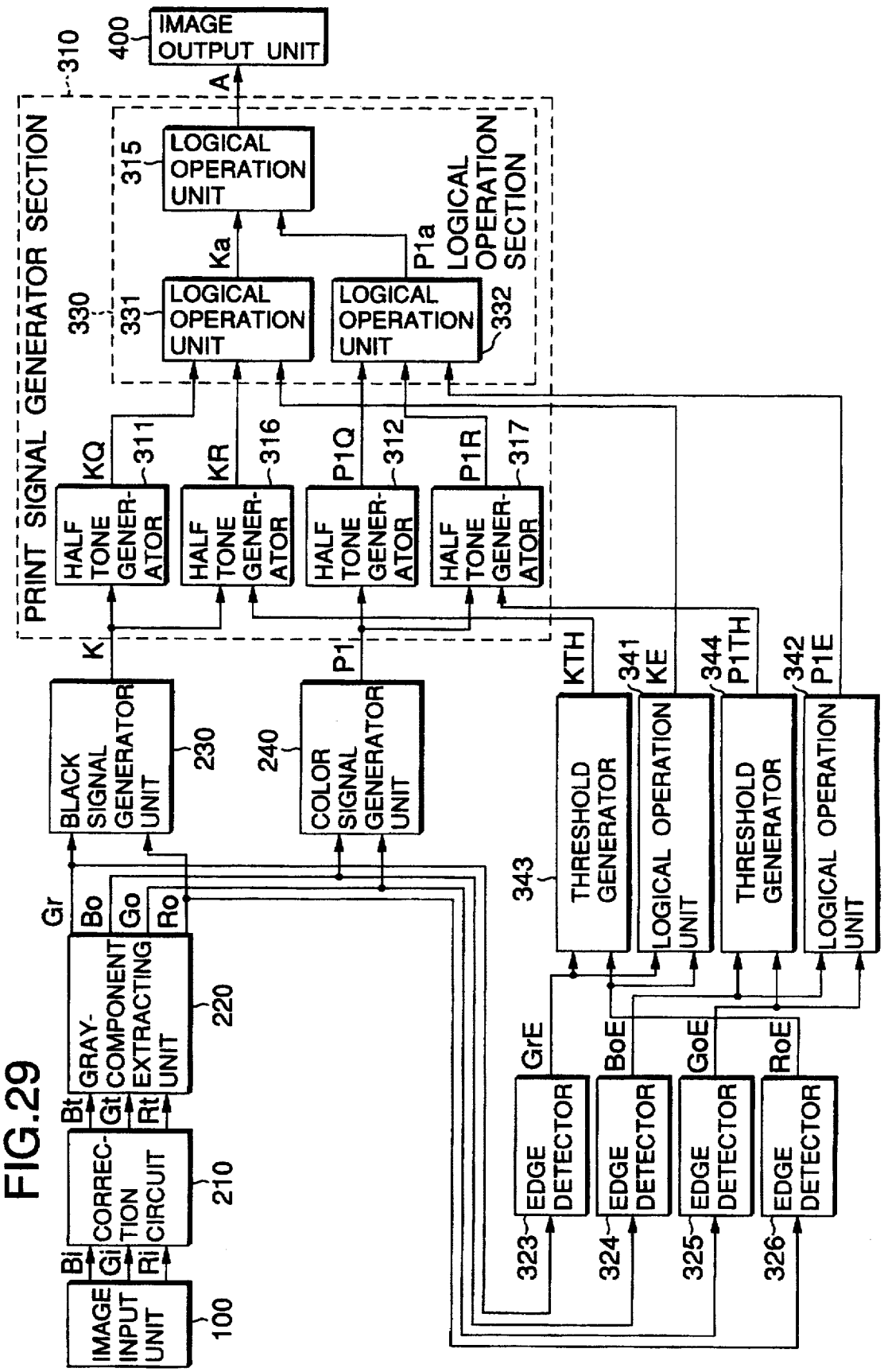
FIG. 29 is a block diagram showing a fourteenth embodiment of an image processing system according to the present invention.

FIG. 29 is a block diagram showing of an image input/output device incorporating an image processing system according to an fourteenth embodiment of the present invention. The image processing system shown in FIG. 29 corresponds to the combination of the image processing systems shown in FIGS. 27 and 28. As shown, the threshold generators 343 and 344 are provided. The threshold generators 343 and 344 transfer to the halftone generators 316 and 317 the threshold values KTH and P1TH, which is given by the equations (39) and (40), as the binary threshold values for transforming the black signal K and the color signal P1 into the binary black signal KR and the binary color signal P1R. The image processing system of FIG. 29 has the useful effects comparable with those of the FIG. 28 system.

Also in the image processing systems of FIGS. 28 and 29, if the sophisticated process to binarize the black signal K and the color signal P1 by comparing them with the threshold values of the dither matrices, not the simple binarizing process, is used for the halftone generators 316 and 317 as in the systems of FIGS. 23, 24, 26 and 27, the threshold values in the halftone generators 316 and 317 are varied by the output values of the threshold generators 343 and 344.

Figure 30:
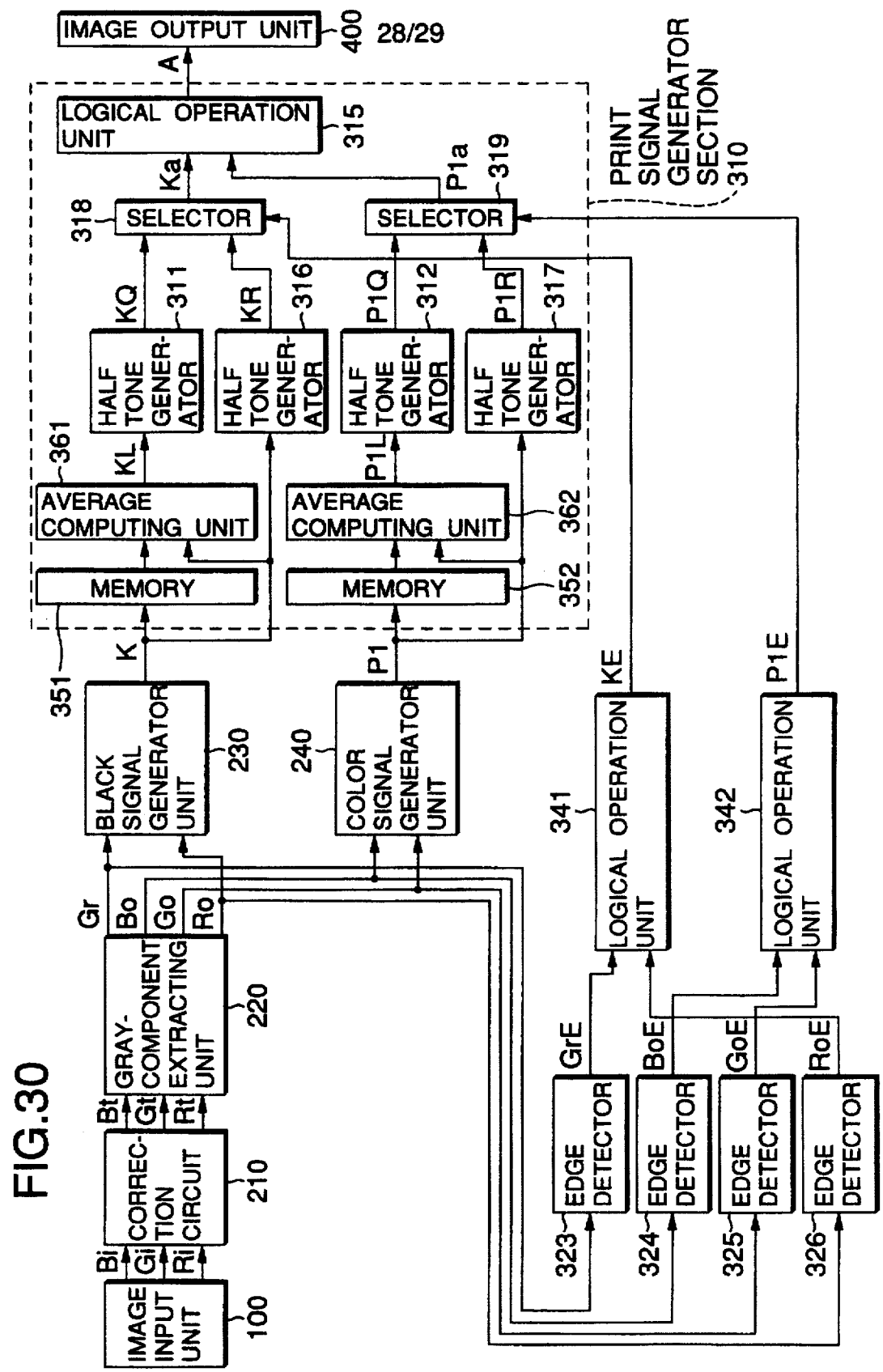
FIG. 30 is a block diagram showing a fifteenth embodiment of an image processing system according to the present invention.
Figure 31:
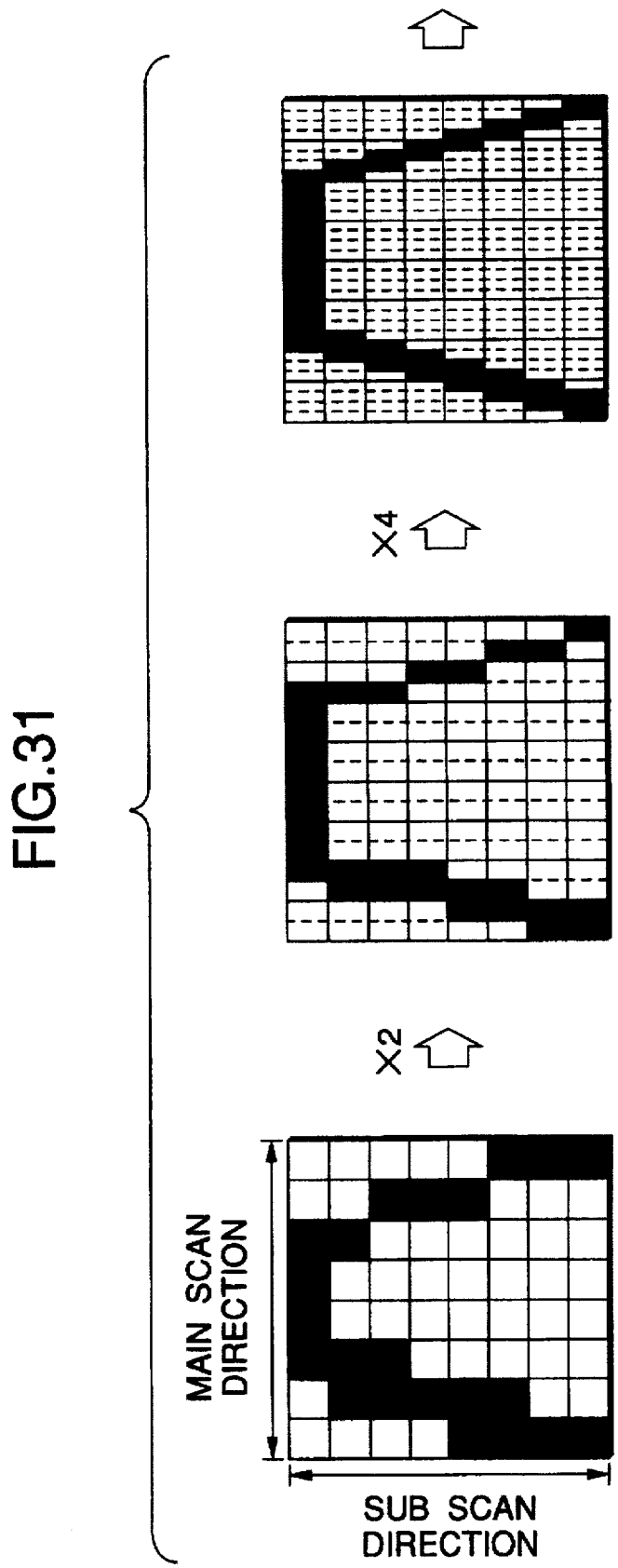
FIG. 31 is a diagram for explaining a half tone generating method in which a high resolution is effectively formed by increasing the frequency of a clock signal for the fast scan.

FIG. 30 is a block diagram showing of an image input/output device incorporating an image processing system according to an fifteenth embodiment of the present invention. In the present image processing system, the non-edge area in the original color image is reproduced as a corresponding area of the black and the color dots being formed at low resolution in the output image.

In the image processing system of FIG. 30, the print signal generator section 310 corresponds to the print signal generator section 310 in the FIG. 26 system which additionally includes a combination of a memory 351 and an average computing unit 361, and another combination of a memory 352 and an average computing unit 362.

The memory 351 is a buffer memory for delaying a black signal K from the black signal generating unit 230, by one line. The memory 351 outputs a delayed black signal, and the black signal generating unit 230 produces a black signal K, not delayed. Those black signals, delayed and not delayed, are applied to the average computing unit 361. The average computing unit 361 receives black signals of two lines, and averages the values of the black signals of four pixels every 2×2 pixels. The halftone generator 311 compares the averaged black signal KL with the threshold values of the dither matrix as shown in FIG. 10A, thereby generating a binary black signal KQ for black dot printing.

The memory 352 is a buffer memory for delaying a color signal P1 from the color signal generator unit 240, by one line. The memory 352 outputs a delayed black signal, and the color signal generator unit 240 produces a color signal P1, not delayed. Those color signals, delayed and not delayed, are applied to the average computing unit 362. The average computing unit 362 receives color signals of two lines, and averages the values of the color signals of four pixels every 2×2 pixels. The halftone generator 311 compares the averaged black signal KL with the threshold values of the dither matrix as shown in FIG. 11A, thereby generating a binary color signal P1Q for color dot printing.

In the instant image processing system, the black signal K and the color signal P1, which are derived from the black signal generating unit 230 and the color signal generator unit 240, are transformed into the black signal KL and the color signal P1L, both being at low resolution. The black signal KL and the color signal P1L are transformed into the binary black signal KQ for black dot printing and the binary color signal P1Q for color dot printing, respectively.

In the halftone generators 316 and 317, the black signal K and the color signal P1 are respectively compared with given threshold values, to thereby generate the binary black signal KR for black dot printing and the binary color signal P1R for color dot printing, as of the FIG. 26 system.

In the FIG. 30 system, the non-edge area in the original color image is reproduced as a corresponding area of the black and the color dots being formed at low resolution in the output image.

In the printer of the type in which a black dot and a color dot are developed at the positions of different potential values, for example, the image output unit 400 of the instant system, it is preferable that the dots of the same potential, i.e., the same color, are concentrated at a location. By so doing, the image forming process and hence the quality of the resultant image are stabilized.

In the present embodiment, the resolution of the black signal K and the color signal P1 is reduced to ¼ by calculating an average value of the signals of 2×2 pixels. The reduction rate of the resolution may be set to another value, as a matter of course. The resolution of the input signals to the halftone generators 311 and 312 is reduced in the embodiment mentioned above. The same effect may be achieved if the dither matrices in the halftone generators 311 and 312 or 316 and 317 are so designed.

The image processing systems of FIGS. 27, 28 and 29 may also be designed such that the non-edge area in the original color image is reproduced as a corresponding area of the black and the color dots being formed at low resolution in the output image, as of the FIG. 26 system.

In the seventh to the 15th image processing systems, the dither method is used for generating the half tone by developing the dot patterns in the halftone generators 311 and 312. It is evident that any other suitable method, for example, a density pattern method or a submatrix method, may be substituted for the dither method. The same thing is true for the half tone generation by the halftone generators 316 and 317.

Recently, there is proposed another half tone generating method in which a high resolution is effectively formed by increasing the frequency of a clock signal for the main scan. In the illustration is increased two tick signal is increased two times and four times. There is known another half tone generating method, not shown. In this method, a digital image signal outputted from an image processing system is converted into an analog image signal. The converted analog image signal is compared with a triangle wave signal at fixed periods. The laser device for output image forming is turned on and off in accordance with the results of the comparison. In an additional half tone generating method, the resolution in the sub-scan direction as well as in the main scan direction is improved by using a plural number of laser devices.

For the exposure process, the photo receptor is scanned with a laser beam when any of the half tone generating methods is applied to the image output device of the Xerography type. The technical idea involved in the 7th to the 15th image processing systems as mentioned above may be applied to any of the half tone generating methods by using the signal A outputted from the print signal generator section 310 for the on/off control of the laser device for forming the output image.

As seen from the foregoing description, according to the first image processing system, a color between the adjacent colors of the N number of colors in the output image can continuously be varied. In other words, those colors in the output image are not demarcated. With this, the image processing system thus arranged can provide a good reproduction of the pictorial image, the image containing a graph colored and shaded for 3-dimensional expression, and the image containing an image area of half tone or where color is continuously varied. Additionally, the construction of the image processing system is simple since there is no need of a process for judging the colors of the original color image.

According to the second image processing system, even the image output unit 400, which is of such a type that it can print black and color dots to form an output image but cannot print the black and the color dots at the same dot position in superposed fashion, can reproduce an original image of high quality in a less number of colors in which the color between the two colors is continuously varied.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus for converting a color image into an image of an N (N=2, 3, ...) number of colors that contain at least black, comprising:

gray-component extracting means for extracting a gray component signal from input color image signals and producing remaining-color-component signals;

black signal generating means for generating a black signal by using the gray component signal and the remaining-color-component signals; and color signal generating means for generating a color signal by using the remaining-color-component signals;

wherein said black signal generating means includes:
      first multiplying means for multiplying the remaining-color-component signals by first coefficients; and
      first generating means for generating a black signal using the remaining-color-component signals and the gray component signal, and said color signal generating means includes:
      second multiplying means for multiplying the remaining-color-component signals by second coefficients different from the first coefficients, and
      second generating means for generating the color signal using the remaining-color-component signals as the result of the multiplying operation.

2. The image processing apparatus according to claim 1, wherein said first generating means extracts a signal representative of the maximum value of the values of the remaining-color-component signals as the result of the multiplying operation and the value of the gray component signal, and produces the maximum value signal as the black signal, and said second generating means extracts a signal representative of the maximum value of the values of the remaining-color-component signals as the result of the multiplying operation, and produces the maximum value signal as the color signal.

3. The image processing apparatus for converting a color image into an image of an N (N=2, 3, ...) number of colors that contain at least black, comprising:

gray-component extracting means for extracting a gray component signal from input color image signals and producing remaining-color-component signals;

black signal generating means for generating a black signal by using the gray component signal and the remaining-color-component signals;

color signal generating means for generating a color signal by using the remaining-color-component signals;

first print signal generating means for developing a black signal outputted from said black signal generating means into a black dot pattern;

second print signal generating means for developing a color signal outputted from said color signal generating means into a color dot pattern; and adjust means for adjusting the print signals outputted from said first and said second print signal generating means so that when a black dot of the black dot pattern and a color dot of the color dot pattern occupy the same dot position, one of the black and the color dots is preferentially used for print.

4. The image processing apparatus according to claim 3, further comprising comparing means for comparing the value of the black signal from said black signal generating means with the value of the color signal from said color signal generating means, and wherein when the result of the comparison by said comparing means shows that the value of the black signal is larger than the value of the color signal, said adjust means selects the black dot for print, and when the result of the comparison by said comparing means shows that the value of the color signal is larger than the value of the black signal, said adjust means selects the color dot for print.

5. The image processing apparatus according to claim 3, wherein said adjust means selects a preset dot pattern for print.

6. The image processing apparatus according to claim 3, further comprising edge detect means for detecting an edge area in a color image, and wherein at least one of said first and said second print signal generating means includes a plural number of dot pattern developing means each for developing a black signal from said black signal generating means or a color signal from said color signal generating means into a plural number of different black dot patterns or a plural number of different color dot patterns, and select means for selecting one of said plural number of dot pattern developing means in accordance with the result of edge detection by said edge detect means.

7. The image processing apparatus according to claim 3, further comprising edge detect means for detecting an edge area in a color image, and wherein one of said first and said second print signal generating means includes a plural number of dot pattern developing means each for developing a black signal from said black signal generating means or a color signal from said color signal generating means into a plural number of different black dot patterns or a plural number of different color dot patterns, and for the pixels in the edge area on a color image that is detected by said edge detect means, the logical sum of the output signal of said plurality of dot pattern developing means is produced as an output signal of said corresponding print signal generating means.

8. The image processing apparatus according to claim 3, further comprising edge detect means for detecting an edge area in a color image, and wherein one of said first and said second print signal generating means includes converting means for converting a black signal from said black signal generating means or a color signal from said color signal generating means into a plural number of black or color signals at different resolutions, a plural number of dot pattern developing means each for developing the plural number of black or color signals into a plural number of different black dot patterns or a plural number of different color dot patterns, and select means for selecting one of said plural number of dot pattern developing means in accordance with the result of edge detection by said edge detect means.

* * * * *